(12) United States Patent
Janakiraman et al.

(10) Patent No.: US 10,645,002 B2
(45) Date of Patent: May 5, 2020

(54) SYSTEM, APPARATUS AND METHOD FOR MANAGING REDUNDANCY ELIMINATION IN PACKET STORAGE DURING OBSERVATION OF DATA MOVEMENT

(71) Applicant: Hewlett Packard Enterprise Development LP, Houston, TX (US)

(72) Inventors: Ramsundar Janakiraman, Fremont, CA (US); Prasad Palkar, Sunnyvale, CA (US); Mohan Parthasarathy, Cupertino, CA (US); Brijesh Nambiar, Santa Clara, CA (US); Giri Gopalan, Saratoga, CA (US); Shankar Subramaniam, Cupertino, CA (US); Suhas Shetty, Saratoga, CA (US); Steven Alexander, Woodside, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/743,902

(22) Filed: Jun. 18, 2015

(65) Prior Publication Data
US 2015/0372910 A1 Dec. 24, 2015

Related U.S. Application Data

(60) Provisional application No. 62/015,351, filed on Jun. 20, 2014.

(51) Int. Cl.
*H04L 12/741* (2013.01)
*H04L 12/747* (2013.01)
*H04L 12/743* (2013.01)

(52) U.S. Cl.
CPC .......... *H04L 45/74* (2013.01); *H04L 45/742* (2013.01); *H04L 45/7453* (2013.01)

(58) Field of Classification Search
None
See application file for complete search history.

(56) References Cited

U.S. PATENT DOCUMENTS 5,331,646 A * 7/1994 Krueger ............ G11B 20/1833
714/6.1
5,813,009 A 9/1998 Johnson et al.
(Continued)

OTHER PUBLICATIONS

PCT/US2015/036976 filed Jun. 22, 2015 International Search Report and Written Opinion dated Sep. 14, 2015.
(Continued)

*Primary Examiner* — Omer S Mian
*Assistant Examiner* — Hong Shao
(74) *Attorney, Agent, or Firm* — Sheppard Mullin Richter & Hampton

(57) ABSTRACT

A network sensor that features a data store and a packet processing engine. In communication with the data store, the packet processing engine comprises (1) a cache management logic and (2) deduplication logic. The cache management logic is configured to analyze packets to determine whether (a) a packet under analysis include duplicated data and (b) content of the packet is targeted for storage in a same continuous logical storage area as the duplicated data. The deduplication logic, when activated by the cache management logic, is configured to generate a deduplication reference for insertion into the packet prior to storage.

20 Claims, 14 Drawing Sheets

(56) References Cited

U.S. PATENT DOCUMENTS

| | | | |
|---|---|---|---|
| 7,913,303 B1 | 3/2011 | Rouland et al. | |
| 8,495,747 B1 | 7/2013 | Nakawatase et al. | |
| 2006/0095695 A1 | 5/2006 | Daniels et al. | |
| 2007/0150691 A1 | 6/2007 | Illendula et al. | |
| 2008/0294696 A1* | 11/2008 | Frandzel | G06F 3/0608 |
| 2009/0106843 A1 | 4/2009 | Kang et al. | |
| 2009/0234870 A1* | 9/2009 | Bates | G06F 16/24556 |
| 2010/0098318 A1* | 4/2010 | Anderson | G06K 9/186 |
| | | | 382/137 |
| 2011/0016091 A1* | 1/2011 | Prahlad | G06F 11/1453 |
| | | | 707/654 |
| 2011/0035802 A1 | 2/2011 | Arajujo, Jr. et al. | |
| 2012/0102003 A1* | 4/2012 | Bhattacherjee | G06F 17/30489 |
| | | | 707/692 |
| 2012/0102136 A1 | 4/2012 | Srebrny et al. | |
| 2013/0018852 A1 | 1/2013 | Barton et al. | |
| 2013/0132653 A1 | 5/2013 | Post et al. | |
| 2014/0181432 A1 | 6/2014 | Horn | |
| 2014/0237545 A1 | 8/2014 | Mylavarapu et al. | |
| 2015/0281260 A1 | 10/2015 | Arcamone et al. | |
| 2015/0370723 A1 | 12/2015 | Nambiar et al. | |

OTHER PUBLICATIONS

PCT/US2015/036987 filed Jun. 22, 2015 International Search Report and Written Opinion dated Sep. 21, 2015.

U.S. Appl. No. 14/743,892 filed Jun. 18, 2015 Advisory Action dated Sep. 19, 2017.

U.S. Appl. No. 14/743,892 filed Jun. 18, 2015 Final Office Action dated Jun. 30, 2017.

U.S. Appl. No. 14/743,892 filed Jun. 18, 2015 Non-Final Office Action dated Dec. 1, 2017.

U.S. Appl. No. 14/743,892 filed Jun. 18, 2015 Non-Final Office Action dated Dec. 19, 2016.

* cited by examiner

SYSTEM, APPARATUS AND METHOD FOR MANAGING REDUNDANCY ELIMINATION IN PACKET STORAGE DURING OBSERVATION OF DATA MOVEMENT

CROSS-REFERENCE TO RELATED APPLICATIONS

This application claims the benefit of U.S. Provisional Application No. 62/015,351, filed Jun. 20, 2014, the entire contents of which are incorporated herein by reference.

1. FIELD

Embodiments of the disclosure relate to the field of data storage for network and cyber security systems. More specifically, one embodiment of the disclosure relates to a system, apparatus and method for managing redundancy elimination through configuration of a layered storage architecture that supports bounded deduplication references and controlled management of the data cache.

2. GENERAL BACKGROUND

Over the last few years, the general populous has encountered the proliferation of malicious software (sometimes referred to as "malware") over the Internet. Malware has many forms including exploits, namely information that attempts to take advantage of a vulnerability in software that is loaded onto an electronic device in order to adversely influence or attack operations of that electronic device. Despite repeated efforts through advanced detection systems and software patches to address software vulnerabilities, malware continues to evade and infect electronic devices worldwide.

In combating the spread of malware, it has become paramount that a vast amount of information associated with network traffic, which is propagating to/from/within an enterprise network over a prolonged period of time, is persistently stored. This stored information offers immeasurable value for incident response testing so that security personnel can better understand when and how a network breach (malware infection of one or more endpoint devices within an enterprise network) occurred in order to address current security issues associated with the enterprise network. However, with increasing link speeds at the demilitarized zone (i.e., the physical or logical subnetwork of the enterprise network that interfaces a larger, untrusted network such as the Internet for example) and with network breaches occurring on average 200 or more days before detection, it is becoming cost prohibitive for conventional security systems to maintain needed information using conventional package storage solutions.

Currently, conventional packet storage solutions exist in the marketplace, but these storage solutions acquire packets and write them directly into storage without modification. While some of these conventional packet storage solutions may utilize compression, such compression offers meager storage savings.

It is contemplated that certain redundancy elimination (RE) techniques, such as deduplication for example, are not known to have been used by conventional packet storage solutions. Rather, deduplication has been used in the area of data backup as well as by Wide Area Network (WAN) acceleration products to avoid duplicate transmission of data already sent over the link in the past. In fact, it is believe that deduplication is currently not feasible for packet storage solutions based on significant operational disadvantages that would result.

For instance, packet storage is limited, and thus, as storage reaches capacity, old data would need to be removed (purged) and new data would need to be written into storage. According to conventional deduplication techniques, the stored reference for new data may refer to some purged data. This will render the newly written data useless since portions of the new data will be missing.

Also, for packet storage solutions that utilize hard disk drives for example, the scope of collateral data loss caused by disk failures at storage regions with references generated through conventional deduplication techniques is difficult to easily ascertain and the loss has to be contained. Hence, any packet storage solution that utilizes disk storage and conventional RE techniques could be rendered completely or substantially inoperable upon experiencing a disk failure.

Lastly, the presence of a chain of references may cause significant delays in packet retrieval. For instance, when a specific packet is retrieved from the packet store, cascaded references of packets could lead to reconstruction of one or more packets resulting in retrieval of the whole cascaded chain. As an illustrative example, a reference in packet B may refer to the same data within packet A and another reference in packet C may refer to the reference in packet B. Hence, the retrieval of packet C will implicitly result in retrieval of packet B and as well packet A, where these ancillary retrievals may unnecessary increase load on packet processing capabilities and increase the delay in retrieving packet C.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
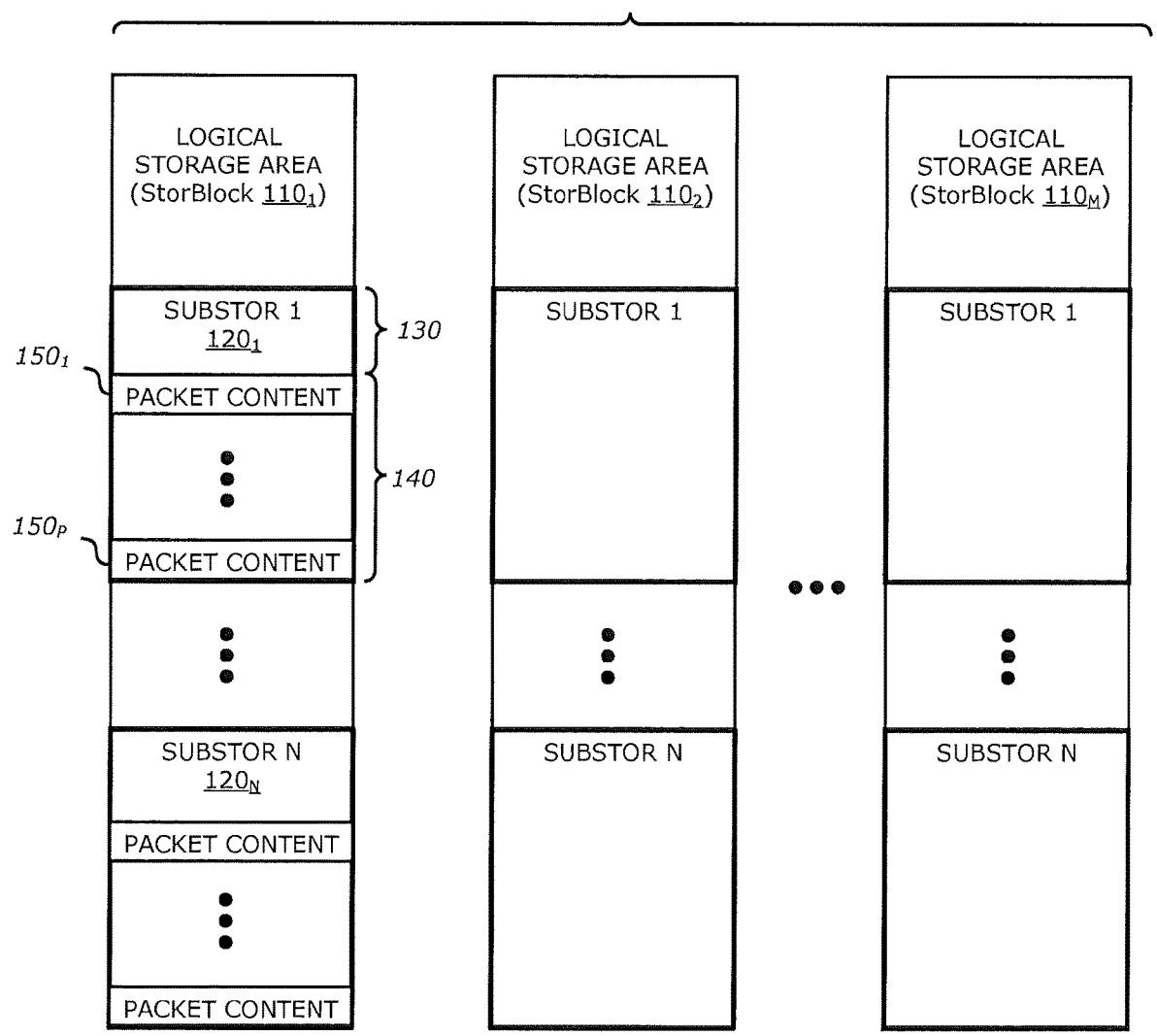
FIG. 1 is an exemplary block diagram of a logical storage architecture that is configured in the management of redundancy elimination and data (dedup) cache storage.

Various embodiments of the disclosure relate to a network sensor engine that manages deduplication through configuration of a layered storage architecture that supports "bounded" deduplication references and manages data (dedup) cache storage. Such management is adapted to increase storage efficiency at the data cache while keeping the size of the cache manageable and mitigating retrieval latency and potential data loss.

In particular, redundancy elimination may be achieved through management of deduplication in packet storage by constraining the deduplication references so that a "bounded" deduplication reference may refer only to stored content within the same contiguous, logical storage area. This contiguous, logical storage area, referred to herein as a "StorBlock," is a hardware abstract for mapping content into non-transitory storage medium. Redundancy elimination may be further achieved through management of the data (dedup) cache, where "active" content-based hash values (e.g., rolling hash values associated with detected duplicated content) populate the data cache under control of a first level content analysis device while representative data for "inactive" content-based hash values is maintained within a data store.

More specifically, one or more contiguous, logical storage areas (StorBlocks) operate as a hardware abstraction for storage logic, which represents logical storage (e.g., a volume or logical drive) and/or physical storage. For instance, the storage logic may correspond to one or more hard disk drives and each StorBlock may correspond to a prescribed region or regions of the hard disk drive(s), a Redundant Array of Independent Disks (RAID) type storage, or storage over a network such as Network File System (NFS) or Internet Small Computer System Interface (iSCSI).

According to one embodiment of the disclosure, each bounded deduplication reference is permitted to refer to data within the same StorBlock. In other words, bounded deduplication references are not permitted to access data within a different StorBlock (i.e., the deduplication reference does not cross a StorBlock). As a result, any loss of data within a StorBlock caused by a data loss event, such as a disk failure for example, is confined to that particular StorBlock and does not affect other StorBlocks. Hence, by mitigating and quantifying potential data loss, deduplication may now be implemented for packet storage.

It is contemplated that the size of a StorBlock is configurable, based on two opposing factors: storage efficiency and data loss mitigation. For instance, larger StorBlocks may support more deduplication references, which may improve the overall storage efficiency of the network sensor engine. Furthermore, any loss of data in a StorBlock could cause loss of the whole StorBlock. Hence, where the StorBlock is smaller is size, there is a greater likelihood that a greater amount of packet data will be accessible for incident response testing and improved network breach detection.

Data cache management involves prioritizing and controlling storage of content-based hash values associated with duplicated content in order to ensure retention of content that may be useful in subsequent malware analysis. In general, storage management logic within the network sensor engine includes a first level content analysis device operating as part of the cache management logic, where the first level content analysis device is adapted to determine whether content with a packet under analysis, represented by a content-based hash value, has been previously stored within a StorBlock to which the packet under analysis has been allocated. The first level content analysis device uses a lesser amount of memory resources than the data cache supporting the same number of content-based hash values. According to one embodiment of the disclosure, a bloom filter may be deployed as the first level content analysis device.

Figure 10:
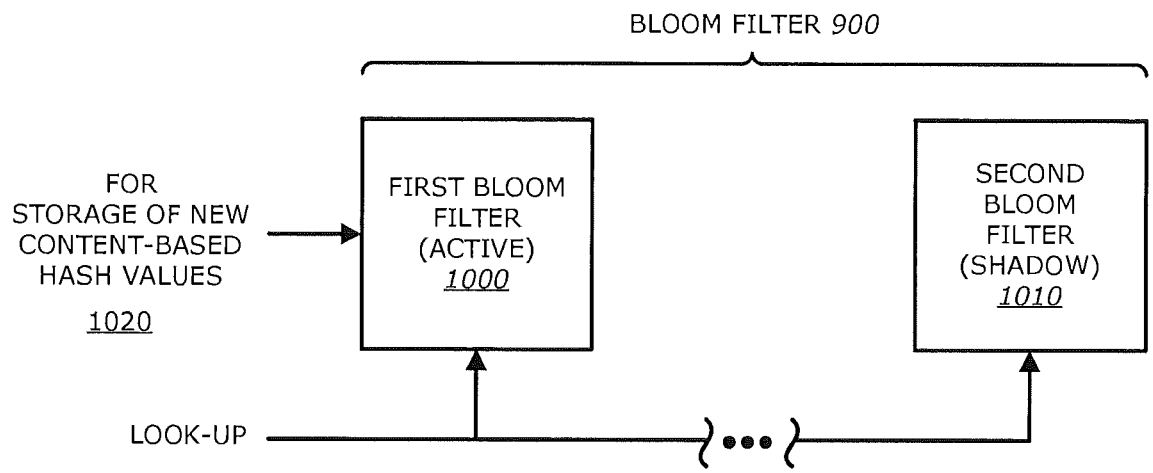
FIG. 10 is an exemplary block diagram of an "aged" bloom filter scheme conducted during data cache management by the cache management logic of FIG. 4A.
Figure 10:
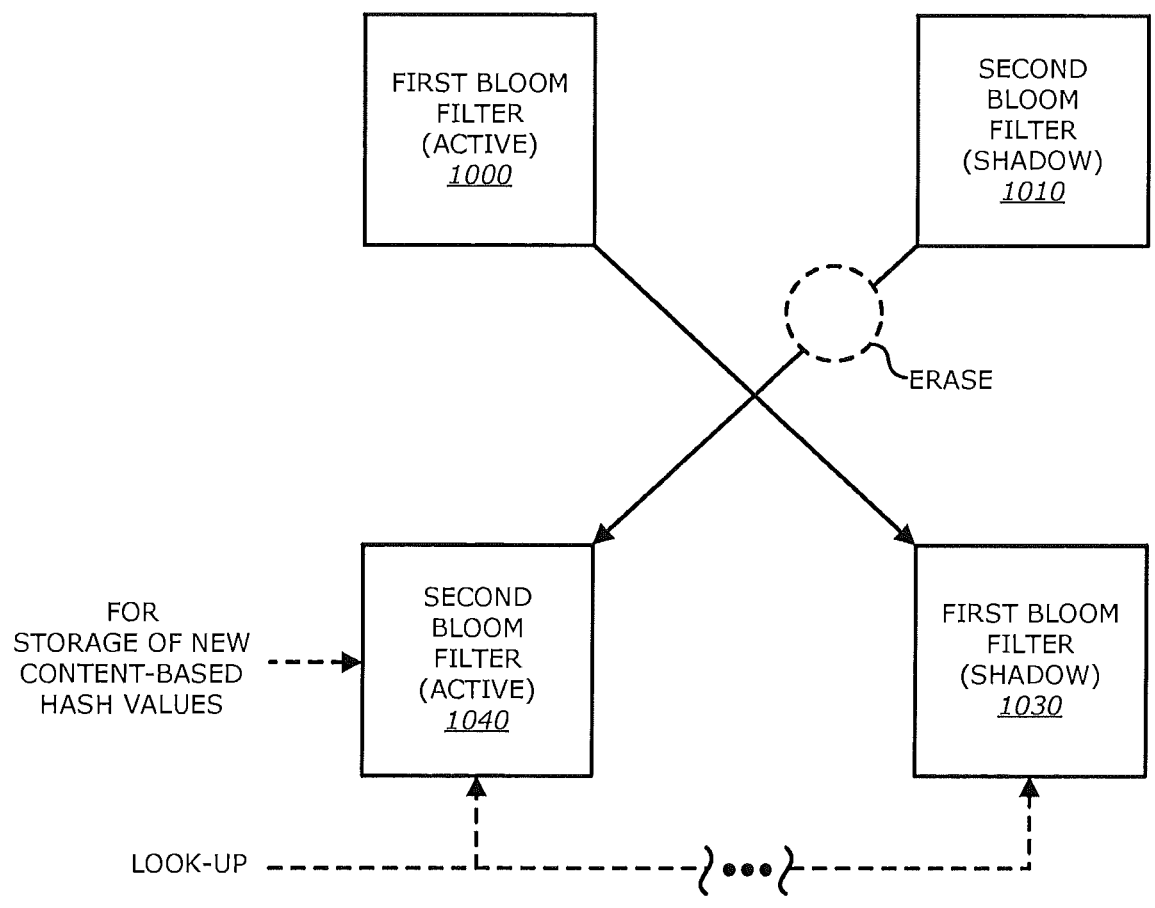

More specifically, when deployed as a bloom filter, the first level content analysis device is not adapted to store content-based hash values per se. Rather, the bloom filter is configured to identify whether input data (e.g., content-based hash value) has been detected previously, and similarly, may identify whether the content-based hash value has possibly been analyzed previously, where a few false positives may occur depending on the size of the bit array used for the bloom filter. Herein, the bloom filter stores values derived from the content-based hash values as part of the analyzed "set" with a data store, but such storage requires significant less memory than the hash values themselves. Also, an "aged" bloom filter may provide further storage savings through removal of less actively accessed content-based has values, as illustrated in FIG. 10.

I. Terminology

In the following description, certain terminology is used to describe features of the invention. For example, in certain situations, the terms "sensor", "logic," and "engine" are representative of hardware, firmware and/or software that is configured to perform one or more functions. For instance, as hardware, a sensor (or logic or engine) may include circuitry having data processing and/or data capturing functionality combined with data transmission and/or storage functionality. A sensor (or logic or engine) may include a processor (e.g., digital signal processor, microprocessor with one or more processor cores, a programmable gate array, a microcontroller, an application specific integrated circuit, etc.), semiconductor memory, and/or wireless or wired transmitter and/or transceiver circuitry.

Alternatively, the sensor (or logic or engine) may be software in the form of one or more software images or software modules, such as executable code in the form of an executable application, an application programming interface (API), a routine or subroutine, a script, a procedure, an applet, a servlet, source code, object code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The terms "data" and "content" are broadly defined as information, normally in digitized form. Hence, data and content may include control information or management information.

The term "traffic" generally refers to one or more flows of information, where each "flow" may be a series of related packets in transit. This series of related packets may feature one of more objects, namely a plurality of related packets operating as an executable element or a non-executable element such as a dynamically link library (DLL), a Portable Document Format (PDF) file, a JavaScript® file, Zip® file, a Flash® file, a document (for example, a Microsoft® Office® document, Word® document, etc.), an electronic mail (email), downloaded web page, a text message, or the like. A "packet" generally refers to any information transmitted in a prescribed format.

The term "transmission medium" is a physical or logical communication path between two or more network devices (e.g., one of the network devices being an endpoint device with data processing and network connectivity such as, for example, a server; a mainframe; a firewall; intermediary devices such as a router, a switch or a bridge; or a client device such as a desktop or laptop computer, netbook, tablet, smart phone, set top box, wearable computing device, or a video game console). For instance, the communication path may include wired and/or wireless segments, and/or shared memory locations. Examples of wired and/or wireless segments include electrical wiring, optical fiber, cable, bus trace, or a wireless channel using infrared, radio frequency (RF), or any other wired/wireless signaling mechanism.

The term "computerized" generally represents that any corresponding operations are conducted by hardware in combination with software and/or firmware. Also, the term "match" generally describes that a certain level of comparison has been successfully achieved.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure be considered as an example of the principles of the invention and not intended to limit the invention to the specific embodiments shown and described.

II. General Logical Storage Architecture

Referring to FIG. 1, an exemplary block diagram of a logical storage architecture 100 that is configured in the management of redundancy elimination and data (dedup) cache storage is shown. Herein, the logical storage architecture 100 includes one or more contiguous, logical storage areas (hereinafter "StorBlocks") $110_1$-$110_M$ (M≥1), where each StorBlock $110_1$-$110_M$ is segmented into a number of prescribed regions ("SubStors") $120_1$-$120_N$ (N≥1).

Herein, StorBlocks $110_1$-$110_M$ formulate a hardware abstraction layer that is configured to directly or indirectly map stored content to a physical storage. More specifically, on the lower layer of the logical storage architecture, an integer multiple of StorBlocks $110_1$-$110_M$ may map to a portion or the entire physical storage (e.g., a volume, etc.). For example, the logical storage architecture 100 may be configured with four (4) StorBlocks $110_1$-$110_4$ that logically map onto a two terabyte (TB) disk, where each StorBlock $110_1$, . . . , and $110_4$ is assigned 512 gigabytes (GB) of memory.

This hardware abstraction provides a few advantages that can be leveraged in redundancy elimination. For example, the use of StorBlocks $110_1$-$110_M$ enables the scope of deduplication references to be "bounded" by restricting deduplication references to only reference storage locations within the same StorBlock and the compression dictionary references being confined to the same SubStor. By restricting the deduplication to reference data within the same StorBlock, a loss of that StorBlock will not affect data on any other StorBlocks.

As other examples, the hardware abstraction allows for adaptation to multiple platform environments including one or more virtual machines, cloud computing, purpose built hardware, or the like. Furthermore, in response to an increase in storage capacity (e.g., increase disk density), hardware abstraction does not require the layout of the storage architecture to be remodeled. Rather, the number or size of the StorBlocks $110_1$-$110_M$ may be increased. Also, this hardware abstraction allows for management of hard disk drives having different disks densities without altering the storage architecture.

The size of each StorBlock $110_1$-$110_M$ may be static or dynamically adjustable. It is noted that dynamic adjustment may be configured so that each StorBlock $110_1$ . . . or $110_M$ is assigned the same amount of physical memory or different StorBlocks $110_1$ . . . or $110_M$ may be assigned different amounts of physical memory. According to one embodiment, the size may be selected based on a ratio of redundancy elimination and the size of the physical storage (e.g., hard disks) available for access.

As each StorBlock $110_1$, . . . , and $110_M$ may be configured as a large storage area, management of the StorBlocks $110_1$-$110_M$ may be a challenge. For instance, some issues may arise from the need to write stored contents within a particular StorBlock (e.g., StorBlock $110_1$) into multiple cores/threads of the system, to allocate memory to write one or more deduplication references and then further compress the deduplicated reference(s). As a result, according to one embodiment of the disclosure, StorBlocks $110_1$-$110_M$ may be segmented into smaller logical storage areas $120_1$-$120_N$ (also referred to herein as "SubStors"), which may have a size from one megabyte (1 MB) up to the order of tens of megabytes (e.g., 64 MB). Hence, information is managed as SubStors $120_1$-$120_N$, where each of the SubStors (e.g., SubStor $120_1$) includes a header 130 and a body 140 that includes compressed packet content $150_1$-$150_P$ (P≥1), namely compressed data from "P" packets associated with network traffic and/or information uploaded by one or multiple sources as described below in reference to FIGS. 3A-3B.

Herein, according to one embodiment of the disclosure, information within a particular SubStor $120_1$ . . . or $120_N$ may be stored within the physical storage (disk/volume) located within network sensor engine 300 or data analysis engine 320 of FIG. 3. When the storage capacity for that particular SubStor reaches a prescribed threshold (e.g., full, exceeds a certain percentage of capacity, etc.), a particular SubStor $120_1$ . . . or $120_N$ (e.g., body and/or header of packets $150_1$-$150_P$) may undergo compression prior to being stored within the physical storage, where the analysis as to whether the prescribed threshold has been reached may be based on the uncompressed state or the compressed state. Hence, some of the factors that may decide the size of the SubStors $120_1$-$120_N$ and the prescribed threshold of transfer of the information to physical storage may include compression efficiency and retrieval latency.

On the higher layer of the logical storage architecture, information may be transferred into one of the SubBlocks $110_1$-$110_M$ in multiple ways. For instance, information associated with one or more flows handled by a particular processor thread can be routed to a selected SubBlock (e.g., SubBlock $110_1$). Thus, management of the SubBlock $110_1$ can be conducted without any synchronization, and when SubBlock $110_1$ reaches the prescribed threshold, the information stored within SubBlock $110_1$ may be pushed to the physical storage. As another option, all encrypted flows or flows using a specific certificate can be routed to a specific SubBlock (e.g., SubBlock $110_2$) without waiting for keys. When the keys are provided at later point in time, the search overhead to decrypt the data for a flow greatly reduces, when a certificate is provided at some later point after the capture. As yet another option, information is transferred based on policy, where packets from specific hosts (e.g., packets from an endpoint device controlled by a high-level official or executive) can be redirected to a specific SubBlock (e.g., SubBlock $110_3$). A description of the layout of the StorBlock is described in FIG. 6.

III. Exemplary System Architecture

Figure 2:
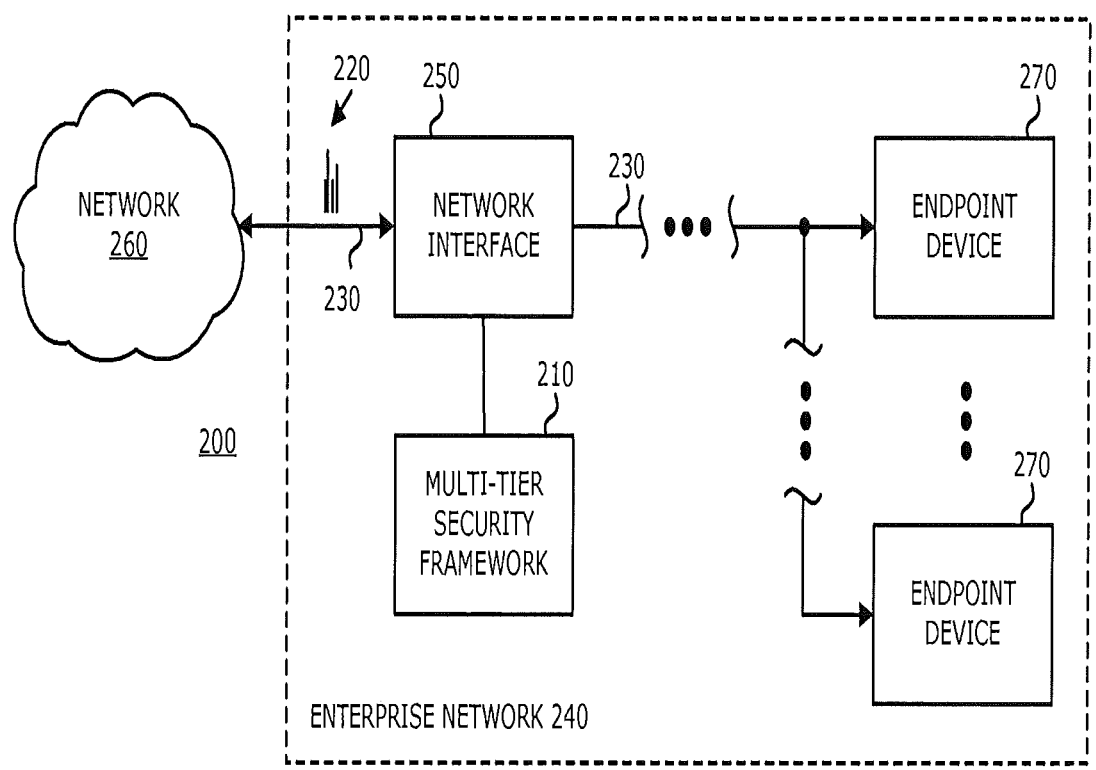
FIG. 2 is an exemplary block diagram of a communication system deploying a multi-tier security framework.

Referring to FIG. 2, an exemplary block diagram of a communication system 200 deploying a multi-tier security framework 210 is shown. The security framework 210 monitors and analyzes information associated with network traffic 220 that is routed over transmission medium 230 forming an enterprise network 240. According to one embodiment of the disclosure, the security framework 210 receives, processes and/or stores input information associated with communications occurring within the enterprise network 240.

As shown, the security framework 210 may be communicatively coupled with the transmission medium 230 via a network interface 250. In general, the network interface 250 operates as a data capturing device (sometimes referred to as a "tap" or "network tap") that is configured to receive information propagating to/from one or more endpoint devices 270 and provide at least some of this information to the security framework 210. For instance, the network interface 250 may provide a series of packets or certain content within the packets. Of course, input information from the network interface 250 may be duplicative of information previously detected over transmission medium 230. Alternatively, although not shown, the security framework 210 may be positioned in-line with the endpoint device(s) 270 without the network interface 250. As another alternative, the network interface 250 may be part of the security framework 210.

Herein, as an illustrative example, the input information may include information associated with one or more messages forming incoming network traffic received via a communication network 260. The communication network 260 may include a public network (e.g., Internet) in which case one or more security appliances, such as a firewall for example, are positioned to receive and process network traffic prior to receipt by logic within the security framework 210. Alternatively, the communication network 260 may be a private network such as a wireless data telecommunication network, wide area network (WAN), a type of local area network (LAN), or a combination of networks. As other illustrative examples, the input information may include log information, one or more flow based collections such as netflow (e.g., OSI Layer 4 "L4" information regarding communications monitored by other network devices), and host telemetry information (e.g., information from endpoint devices 270), as described below.

Although FIG. 2 illustrates the multi-tier security framework 210 within the enterprise network 240, in some embodiments, the multi-tier security framework 210 is at least partially located outside the enterprise network 240. For example, at least some of the functions of the multi-tier security framework 210 may be performed over a different type of network (e.g., in the "cloud" over the Internet or other WAN). This is illustrated with the multi-tier security framework 210 in dashed lines in the communication network 260.

Figure 3A:
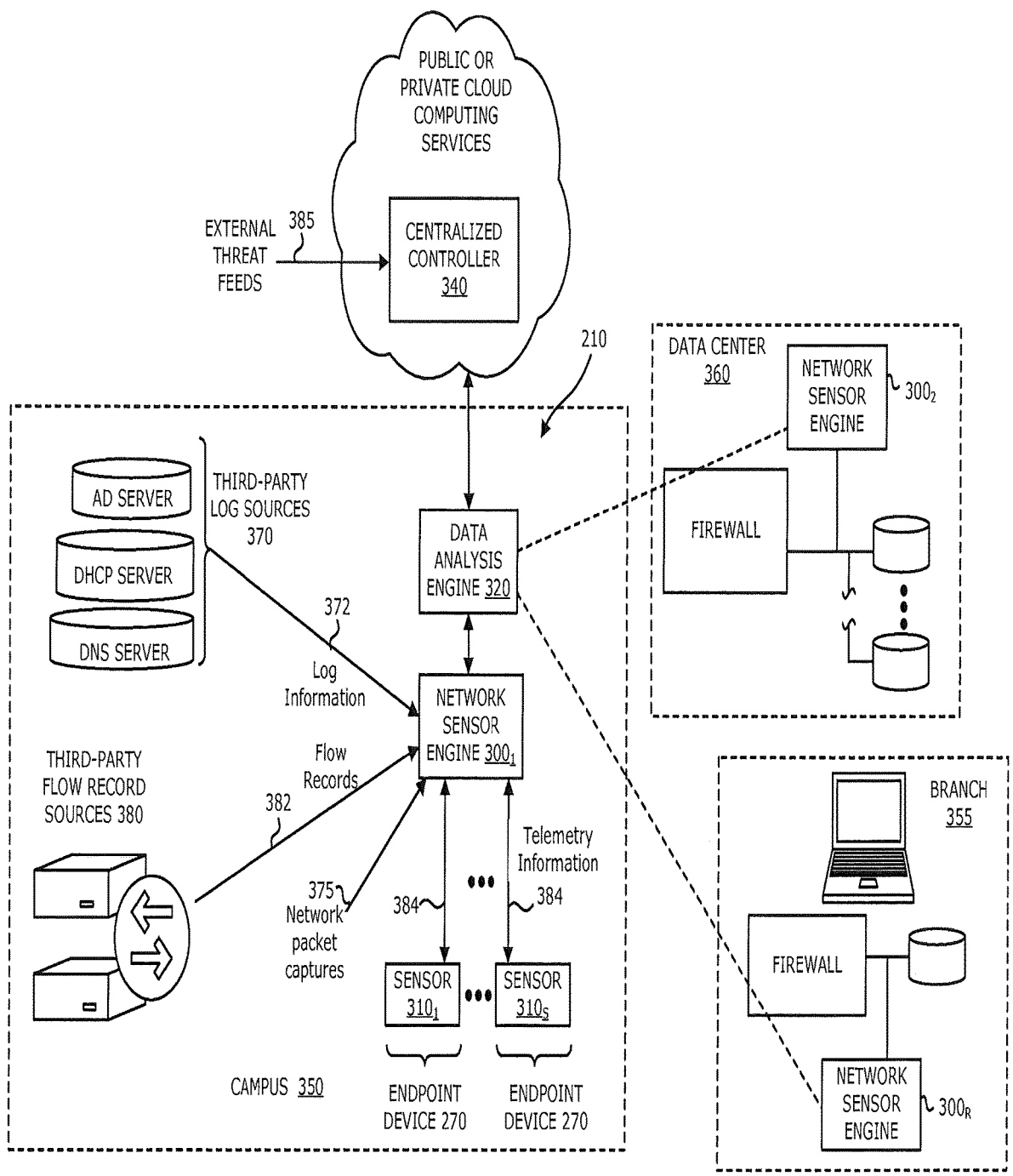
FIG. 3A is an exemplary block diagram of the security framework of FIG. 2.
Figure 3B:
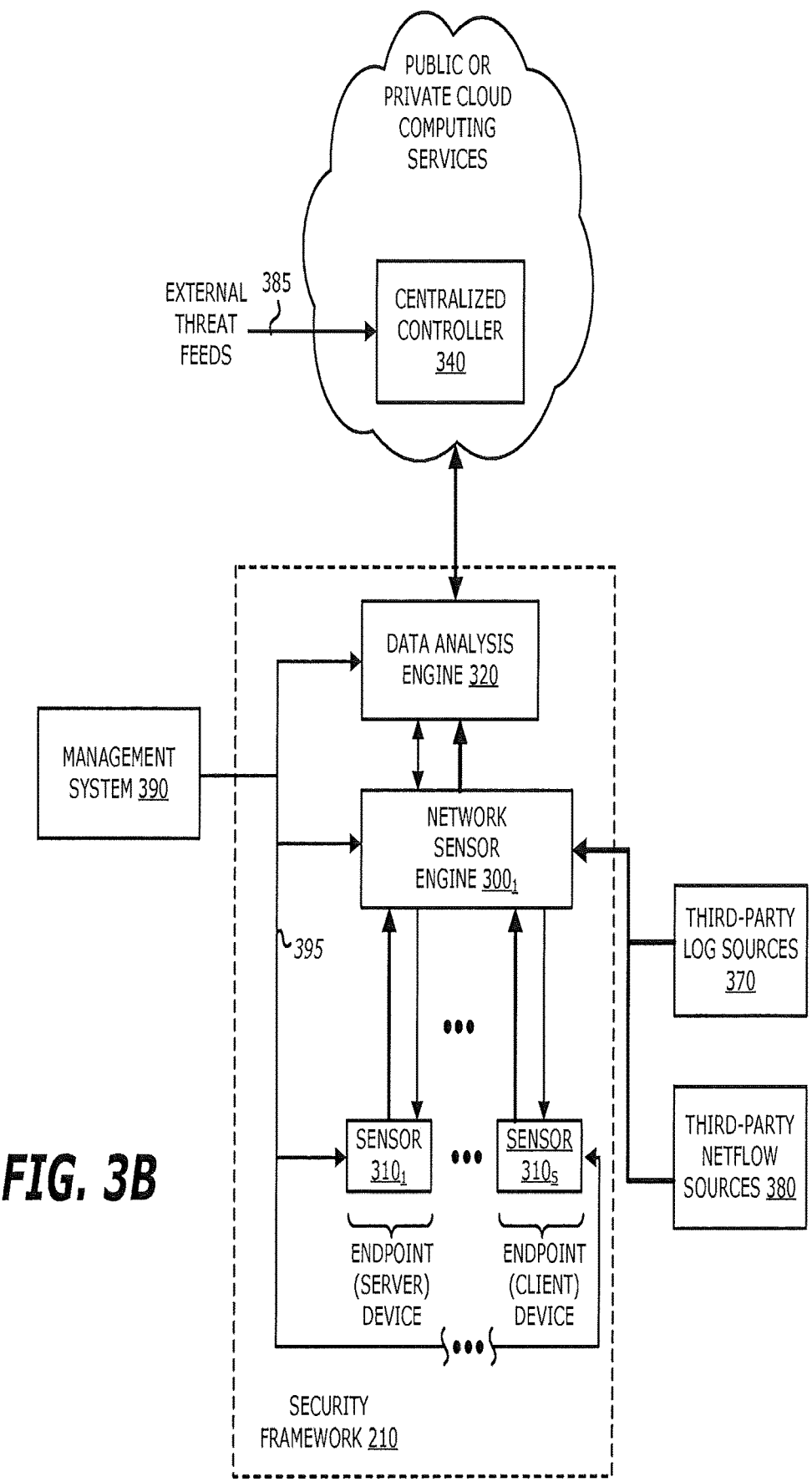
FIG. 3B is a general block diagram of the interoperability of a management system and the security framework of FIG. 2.

According to one embodiment of the disclosure, as illustrated in FIGS. 3A and 3B, the security framework 210 comprises one or more network sensor engines $300_1$-$300_R$ (R≥1), a data analysis engine 320 and a centralized controller 340. Deployed at various locations within the enterprise network 140 (e.g., campus 350, branch 355, data center 360, etc.), as shown in FIG. 3A, each of the one or more network sensor engines (also referred to as "network sensor engine(s)") $300_1$-$300_R$ may be configured to receive, process and/or store (i) information associated with monitored incoming packets that form network traffic, including extracted objects (e.g., files) (e.g., network packet captures 375 received from the network interface 250 or other devices on the network such as receipt through a SPAN port); (ii) log information from different network devices (e.g., third-party log sources 370 such as Active Directory® server logs, Domain Name System "DNS" server logs, Dynamic Host Configuration Protocol "DHCP" server logs, etc.); (iii) flow records 382 from third-party flow record sources 380; and (iv) host telemetry information 384 from one or more endpoint devices 270 (e.g. client devices and/or servers). Given the amount of information that is being stored, each network sensor engine $300_1$, . . . , or $300_R$ is configured to perform deduplication using bounded deduplication references and/or conduct redundancy elimination in packet storage, as described below and illustrated in FIGS. 4A-10.

As further shown in FIGS. 3A and 3B, the network sensor engine(s) $300_1$-$300_R$ include at least a first network sensor engine $300_1$ that is adapted to communicate with one or more endpoint sensors $310_1$-$310_S$ (S≥1), which collect and/or store information associated with the endpoint devices 270 (e.g., client devices and/or servers) that is referred to as host telemetry data. These endpoint sensor(s) $310_1$-$310_S$ may be configured as lightweight software sensors deployed on endpoint devices 270 (e.g., client devices and/or servers), where the endpoint sensor(s) $310_1$-$310_S$ are adapted to gather information associated with the endpoint devices 270 and provide such information to a particular network sensor engine (e.g., first network sensor engine $300_1$) of the network sensor engine(s) $300_1$-$300_R$. For example, the gathered information of a particular endpoint device may include registry settings and/or registry changes of the endpoint device, running processes list of the endpoint device, memory usage information of the endpoint device, network connection information of the endpoint device, operating system patch level of the endpoint device, files modified since the last update, and/or disk/file system activity of the endpoint device. The gathered information may be especially useful when the endpoint devices 270 may be infected. For example, memory usage may be gathered that is associated with malicious activity, network connectivity information may be gathered that is associated with malware, disk/file system activity may be gathered that is associated with malware, etc.

There may be different endpoint sensors deployed for different devices (e.g., an endpoint sensor for a server endpoint device may be configured to gather different information than an endpoint sensor for a client endpoint device). By way of a specific example, where the endpoint device 370 is a server, the host telemetry information may include application logs that indicate a history of applications running on the server, active network connections of the server, files modified on the server, hash of critical files of the server, information (e.g., file name, access date/time, etc.) that has been exfiltrated, or the like.

Furthermore, the first network sensor engine $300_1$ is adapted to receive network packets propagating to/from one or more devices in the network (e.g., information to/from the endpoint devices 270 or other network devices). In some embodiments the first network sensor engine $300_1$ is adapted to extract or generate network sensor data from the network packets. For example, in a specific embodiment, the first network sensor engine $300_1$ is adapted to perform deep packet inspection (DPI) on the packet captures to extract metadata from L2-L7 headers. For example, the first network sensor engine $300_1$ may extract headers associated with Hypertext Transfer Protocol (HTTP) messages.

Furthermore, the first network sensor engine $300_1$ is adapted to receive log information 372 from one or more remotely located servers (e.g., Active Directory® server, DNS server, DHCP server, etc.) that may form part of the enterprise network 140 or operate in concert with network devices within the enterprise network 140. Herein, the "log information" 372 includes information pertaining to events that have been recorded during communications between the remotely located servers and various endpoint devices. In some embodiments the first network sensor engine $300_1$ is adapted to extract and/or generate metadata from the log information 372.

As an example, the first network sensor engine $300_1$ may be adapted to receive log information 372 from any of the third-party log sources 370 such as an Active Directory® server, which enables the first network sensor engine $300_1$ to generate a user/Internet Protocol (IP) address mapping. Since IP addresses are dynamic and may be re-assigned and the security framework is capable of storing data for a prolonged time period, the user/IP address mapping enables the first network sensor engine $300_1$ to determine a particular user (and her corresponding endpoint device) that was previously assigned a particular IP address at a certain period of time and that endpoint device may have been compromised by malware.

As other illustrative examples, the first network sensor engine $300_1$ may be adapted to receive log information 372 from a DNS server, which provides the first network sensor engine $300_1$ with DNS requests made. Also, the first network sensor engine $300_1$ may be adapted to receive log information 372 from the DHCP server, which may be used to generate a device/IP address mapping. Combined with the user/IP address mapping, the user and device assigned to a particular IP address over the prolonged period of time may be uncovered for that IP address despite reassignment of the IP address during the prolonged period of time.

Besides log information 372, the first network sensor engine $300_1$ may be adapted to communicate and receive flow records (e.g., netflow records, sflow records, jflow records, etc.) 382 from third-party flow record sources 380, namely information associated with communications received and/or monitored by other networks devices within the enterprise network 140 (e.g., IP address(es), port number(s), transport type, statistics concerning the network connection, etc.). The flow records 382 enable the data analysis engine 320 (or network sensor engine $300_1$ itself) to formulate a threat exposure mapping (e.g., display of communication paths undertaken by network devices within the enterprise network 140), which may be used to detect anomalous communication patterns through deviations in normal communications by one or more of the network devices, such as an endpoint device (e.g., client device or server) for example. In some embodiments the first network sensor engine $300_1$ is adapted to extract and/or generate metadata from the flow records 382.

Besides receipt and processing of input information as described above, the first network sensor engine $300_1$ may be adapted to generate metadata in a normalized format that is readable by the data analysis engine 320. Some or all of the input information received by first network sensor engine $300_1$ is used to generate the metadata. Herein, as an optional feature, the metadata may be anonymized to remove sensitive or personalized information for the enterprise network 140. For instance, the metadata may be anonymized by substituting a user name associated with the input information being analyzed with a generic identifier. Additionally or in the alternative, the file name assigned to the input information or other properties may be substituted for corresponding generic identifiers, where these generic identifiers may be re-mapped by the first network sensor engine $300_1$ or another network device to recover the user name, file name and/or removed properties.

Normally positioned to reside within the enterprise network 240 of the particular customer, as shown in FIGS. 3A and 3B, the data analysis engine 320 is communicatively coupled to the network sensor engines $300_1$-$300_R$ and receives data from each of the network sensor engines $300_1$-$300_R$, referred to as network sensor data, that may include metadata and/or other data from the network sensor engines $300_1$-$300_R$ (e.g., raw logs, raw flow records, raw packet captures, raw host telemetry information). As an illustrative example, for HTTP traffic monitored by the network sensor engines $300_1$-$300_R$, the network sensor data may include, but is not limited or restricted to attributes within HTTP messages, including Host names, Referer, Uniform Resource Indicator (URI) or Uniform Resource Locator (URL), User-Agent, Mime-type, Method, Version, Cookie, Filename, Character set (Charset) or the like.

Although the data analysis engine 320 is illustrated in FIGS. 3A-3B as being deployed within the enterprise network of a particular customer, the data analysis engine 320 may be deployed in a private cloud or in a public cloud.

Herein, the data analysis engine 320 is adapted to (i) provide open Application Programming Interface (API) access to the stored network sensor data and (ii) conduct analytics on the network sensor data. The analytics may be directed to conventional analytics, ad hoc analytics and predictive analytics.

Conventional analytics include established analytic techniques that are used to provide information associated with suspicious behaviors, where collectively, the suspicious behaviors may suggest malicious activity where one of more of the endpoint devices has been infected with malware. One analytical technique is Domain Generation Algorithm (DGA) to identify suspicious domain names that are contacted by the endpoint devices to receive updates or command.

The ad hoc analytics includes generation of a search display that enables network security personnel to conduct a keyword search to determine if a particular indicator of compromise (IOC) has already been received and processed by an endpoint device. The IOC may include contents from a particular IP address; communications with a particular domain name or IP address; download of a particular file name; a particular file hash value; or the like. Furthermore, the ad hoc analytics may generate a threat exposure mapping that outlines communications detected within the enterprise network or within a sandboxed environment that collectively identify malicious activity.

Predictive analytics comprises statistical modeling, machine learning and/or data mining for analyzing current and/or historical events in order to formulate determinations as to certain network devices within an enterprise network are compromised. For instance, data analysis engine 320 may analyze how certain events along with subsequent detected events may increase or decrease the likelihood of one or more of the endpoint devices being compromised and infected with malware.

The data analysis engine 320 may include a data exchange engine (not shown) that performs collecting data, tokenizing or anonymizing the data (which is optional), and transmitting data to the centralized controller 340 for facilitating global threat intelligence. The data analysis engine 320 may include a local threat intelligence engine that locally caches global threat intelligence from the centralized controller 340 and a refined local threat intelligence for each customer or data analysis engine.

The data analysis engines of different customers are communicatively coupled to the centralized controller 340 and transmit information to the centralized controller 340. The information transmitted from the data analysis engines to the centralized controller 340 may be less and/or different than the information transmitted from the network sensor engines to their corresponding data analysis engines.

Although not illustrated in FIG. 3A, it should be understood that the network sensor engines of branch 355 and data center 360 may each receive host telemetry information from endpoint sensor(s), network packet captures from packet capture device(s), third-party flow record information from third party flow record sources, and/or log information from third-party log sources.

Normally positioned outside the enterprise network 140 for communicative coupling to multiple data analysis engines associated with different customers, such as the data analysis engine 320, the centralized controller 340 facilitates automated collective intelligence by leveraging analytics from a specific customer deployment across an entire population of customers. Furthermore, the centralized controller 340 facilitates community-based collective intelligence by allowing customers to share and leverage security intelligence amongst each other. Also, the centralized controller 340 acts as an intermediary between the components of the security framework 210 and third party services such as external threat feeds 385 and enables security personnel to push threat intelligence to all customer deployments.

The external threat feeds 385 may include blacklisted domains, blacklisted IP addresses, blacklisted filenames and/or file hashes; as well as network sensor data related to that blacklisted data (e.g., threat types, botnet types, first-seen timestamp, last-seen timestamp, URI, etc.). The external threat feeds 385 can be used for customer threat reporting and/or with other data when generating the global threat intelligence.

Referring to FIG. 3B, in order to provide unified management of the security framework 210, a management system 390 may be communicatively coupled and provide control information 395 to the endpoint sensor(s) $310_1$-$310_S$, network sensor engines $300_1$-$300_R$, and/or data analysis engine 320. Herein, according to one embodiment of the disclosure, the management system 390 is responsible for provisioning, monitoring operability and overall management of the sensor(s) $310_1$-$310_S$, the network sensor engines $300_1$-$300_R$, and/or the data analysis engine 320. For instance, the provisioning may include conducting and managing software upgrades in order to increase the speed and ease of deployment and configuration of the security framework 210. Likewise, monitoring operability may include performing, in a periodic or aperiodic manner, health checks of the endpoint sensor(s) $310_1$-$310_S$, network sensor engines $300_1$-$300_R$ and/or data analysis engine 320; collecting log information and performance data; and providing dashboards about overall health of the security framework 210.

Figure 4A:
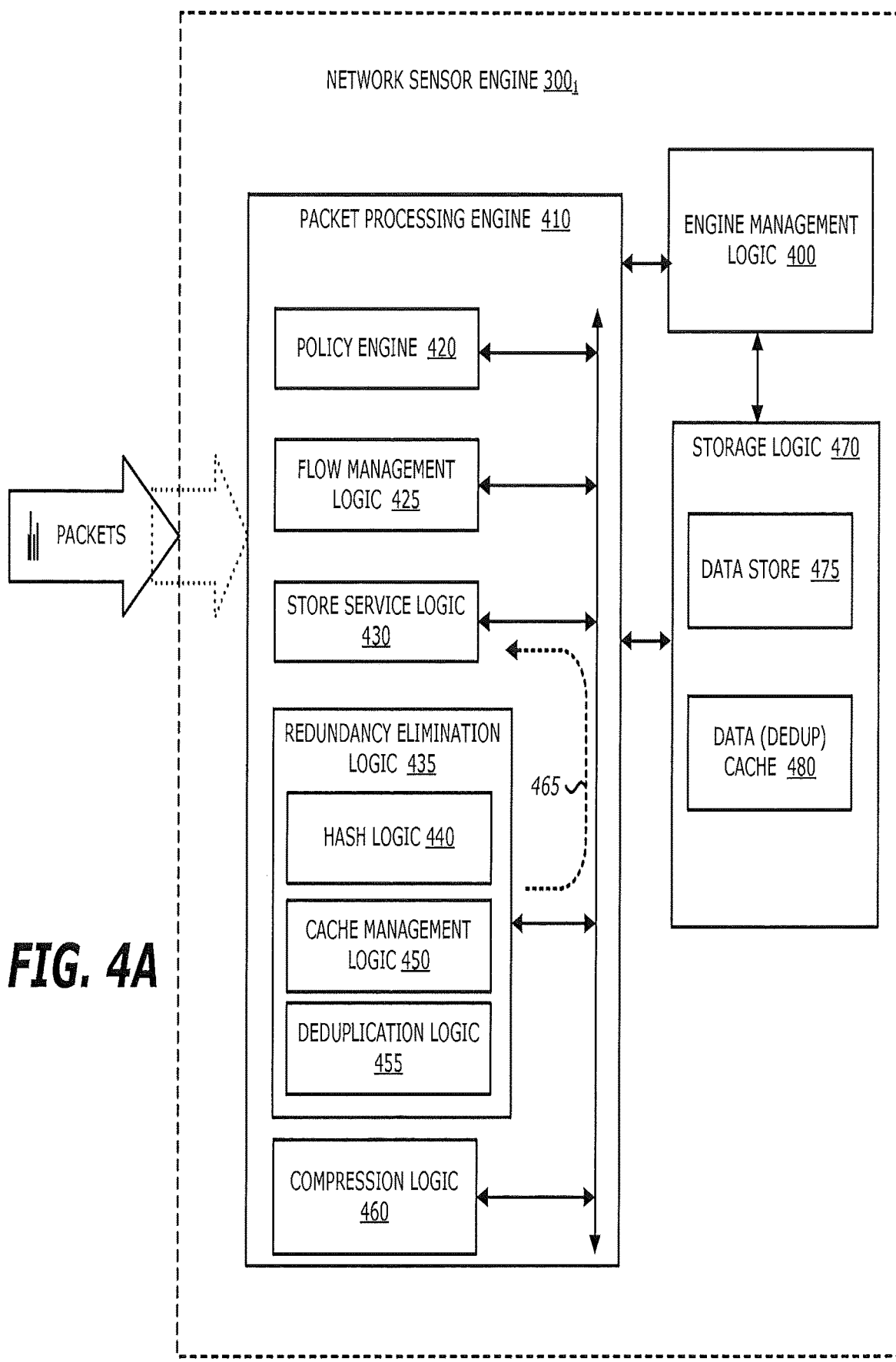
FIG. 4A is an exemplary embodiment of a logical representative of the network sensor engine of FIGS. 3A-3B.

Referring now to FIG. 4A, an exemplary embodiment of a logical representative of the network sensor engine $300_1$ of FIGS. 3A-3B is shown. Herein, the network sensor engine $300_1$ comprises engine management logic 400 communicatively coupled to a packet processing engine 410 and storage logic 470. Herein, the engine management logic 400 is responsible for monitoring changes in operability of the network sensor engine $300_1$ (e.g., additional storage added), and in response, upload changes in storage policy to a policy engine 420 of the packet processing engine 410. Additionally, the engine management logic 400 may be responsible for controlling erasure of stored data from the storage logic 470, which includes a non-transitory storage medium that may include a data store 475 and/or a data (dedup) cache 480. Of course, it is contemplated that the data store 475 and data cache 480 may be logical representations (e.g., software drivers) that control the reading/writing to the physical hardware storage situated within an electronic device including the network sensor engine $300_1$ or situated remotely from the network sensor engine $300_1$.

As shown, the packet processing engine 410 is a multi-threaded process that is capable of running multiple services on the same packet concurrently and is responsible for managing efficient packet storage within the storage logic 470. Such management includes the handling of deduplication through bounded deduplication references and/or data (dedup) cache management through a scalable redundancy elimination technique that prioritizes content-based hash values based on detection activity. For instance, according to one embodiment of the disclosure, the redundancy elimination technique is configured to store "active" content-based hash values (e.g., hash values that correspond to duplicated content more frequently detected in subsequent data transmissions) within the data cache 480 while representative data associated with "inactive" content-based hash values is maintained by the data store 475 (e.g., hash values that correspond to content where no or infrequent duplicated content has been detected), which requires a lesser amount of memory and memory management complexity to store the representative data than content-based hash values.

As illustrated in FIG. 4A, the packet processing engine 410 comprises policy engine 420, flow management logic 425, store service logic 430, redundancy elimination logic 435, and/or compression logic 460. Collectively, these components perform deduplication using bounded deduplication references directed to the same logical grouping of storage (StorBlock) and/or conduct redundancy elimination in packet storage through data cache management in efforts to increase storage efficiency and mitigate retrieval latency and effects of data loss caused by a failure in a portion of storage logic 470.

The policy engine 420 is adapted to determine, for each incoming packet, the number of services (e.g., deduplication, compression, store service, etc.) that are to be applied to that packet. Furthermore, the policy engine 420 may be adapted to push policy (e.g., rules of operation) to the store service logic 430, the redundancy elimination logic 435, and/or compression logic 460 that may be used to control their functionality. For instance, policy engine 420 may provide policy that adjusts the functionality of the store service logic 430 in reserving StorBlocks (described below) for packet storage, such as how logical identifiers are assigned to StorBlocks, the number and/or sizing of the StorBlocks, or the like. Additionally or in the alternative, policy engine 420 may provide (i) policy that adjusts the functionality of the store service logic 430 in reserving various portions of the StorBlocks (referred to as "SubStors" as described below); and/or policy that adjusts data compression (e.g., type, algorithm, and/or data size), the type or version of hash function to generate the content-based hash values, or deduplication operations.

The flow management logic 425 is responsible for detecting packets associated with each flow and maintaining information to identify which flows the monitored packets belong. According to one embodiment of the disclosure, upon detection of a flow, the flow management logic 425 assigns a flow identifier and identifies which packets are assigned to the flow. The packets may be identified through generation of a packet link list for each flow, where a first or last packet in the detected flow (i.e. the header or tail packet) is maintained. This allows the network sensor engine $300_1$ to identify packets associated with a flow starting with the first (or last) packet and walking through the packet listed link to uncover all of the packets associated with that flow, where the packet link list is stored in storage logic 470 separate from data store 475.

The store service logic 430 is responsible for controlling storage of data within the storage logic 470. Based on receipt of a storage request 465 from the cache management logic 450, the store service logic 430 reserves a portion of the physical storage assigned to the StorBlock, namely at least one SubStor that is represented by a logical identifier (hereinafter "logical SubStor_ID"), to the cache management logic 450. Upon the reserved SubStor reaching a prescribed storage capacity, the logical SubStor_ID along with its stored information (after compression by compression logic 460) is returned to the store service logic 430. The store service logic 430 (i) assigns a physical SubStor_ID to signify the physical position of the SubStor, (ii) controls writing of the information associated with the SubStor into the physical storage, (iii) determines an offset from the starting address of the SubStor being written to the starting address for physical memory associated with the StorBlock, and (iv) stores the logical SubStor_ID, physical SubStor_ID and the offset within a header associated with the StorBlock.

Figure 5:
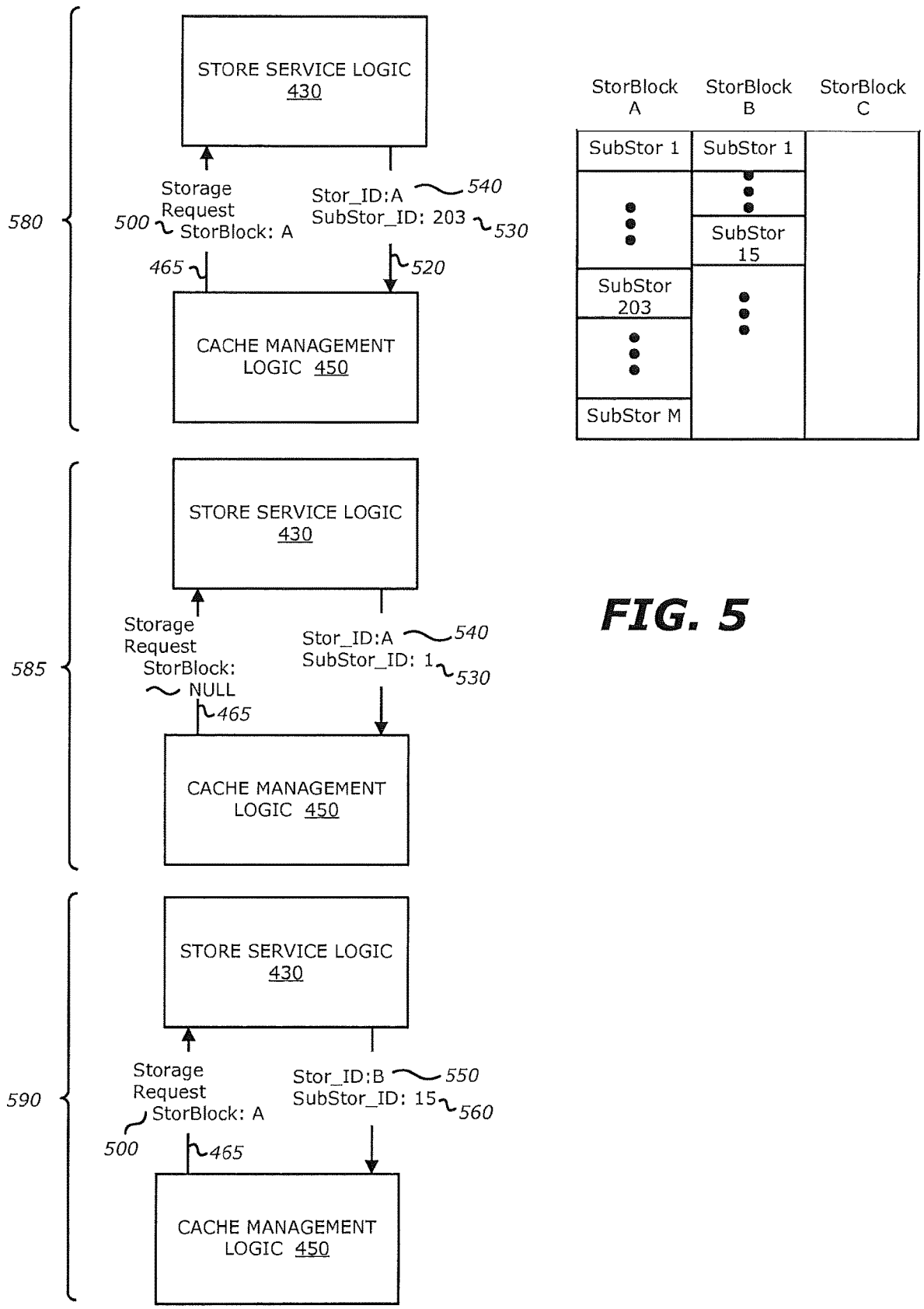
FIG. 5 is an exemplary embodiment of storage allocation conducted by the cache management logic implemented within the network sensor engine of FIG. 4 for generation of "bounded" deduplication references.

According to an illustrative example, as shown in FIG. 5, the storage request 465 may include an identifier of the StorBlock (Stor_ID) 500 that indicates where content is currently being written as shown in the first illustrative example 580. It is contemplated that the number of SubStors requested may be included in the storage request 465. Where cache management logic 450 is not writing to any particular StorBlock, the Stor_ID 510 may be set to a particular value (e.g., NULL, zero, etc.) as shown in the second illustrative example 585. Although not shown, it is contemplated that a number of SubStors may be static (e.g. one SubStor per storage request) or may be dynamic. In a dynamic configuration, the number of SubStors requested may be set as a default to "1", but with visibility of the flow associated with the packet under analysis, it is contemplated that it may be desirable to request allocation of multiple SubStors.

Herein, the store service logic 430 receives the storage request 465 and determines whether the requested storage area can be provided in the same StorBlock currently being used by the cache management logic 450. If so, the store service logic 430 provides, in a response 520, a logical identifier of the allocated SubStor (hereinafter "logical SubStor_ID" 530) and optionally the logical Stor_ID 540 to the cache management logic 450. If the requested SubStor cannot be provided in the same StorBlock currently being used by the cache management logic 540, the store service logic 430 provides a Stor_ID 550 and a Substor_ID 560 for a new StorBlock to the cache management logic 450 as shown in the third illustrative example 590.

Of course, it is contemplated that, in order to simply data management, a storage logic may be maintained over a file system. Herein, the StorBlocks are directories and the StorBlock header is a file identified by Stor_ID 550. Likewise, the SubStors identified by corresponding SubStor_IDs 560 form sub-directories and the SubStor header and SubStor contents are files within the respective sub-directories.

Referring back to FIG. 4A, operating collectively with hash logic 440 and deduplication logic 455, the cache management logic 450 is responsible for analyzing incoming packets to determine whether a packet include duplicated data, namely data already detected in its analysis of a prior packet, and whether the duplicated data would be stored in the same StorBlock. If so, the deduplication logic 455 may be activated to generate a suitable deduplication reference. The cache management logic 450 further manages the allocation of information associated with the analyzed packets into the SubStors.

According to one embodiment of the disclosure, the cache management logic 450 analyzes a chunk of data e.g., 16-512 bytes) within a packet under analysis (to determine whether the chunk of data includes duplicated data. Such analysis may include the hash logic 440 conducting one or more hash operations on the chunk of data to produce a content-based hash value. The chunk size is maintained, but the starting point for the chunk of data may be adjusted to increase or decrease the amount of deduplication operations conducted by the network sensor engine $300_1$.

The cache management logic 450 compares the content-based hash value to a first level content analysis device, such as a type of pre-filter (e.g., bloom filter for example. If a match, the content-based hash value is compared to stored contents within the data (dedup) cache 480. If a match is detected and the duplicated data is stored in the same StorBlock as the matched hash value, the cache management logic 450 activates the deduplication logic 455 to conduct a deduplication operation by writing a deduplication reference in the header of the packet under analysis and removing such data from the stored packet content. If a match is not detected or the duplicated data is stored in a different StorBlock than the StorBlock associated with a matched hash value, the cache management logic 450 does not activate the deduplication logic 455 to refrain for now from conducting a deduplication operation that data. Subsequent deduplication operations may later occur for duplicated content within the same StorBlock.

Compression logic 460 handles compression of SubStor contents prior to being written to physical storage. The compression is performed after deduplication and may be conducted on the body of the packet under analysis and perhaps a portion or the entire header of the packet. It is contemplated that the size of the SubStors can be manipulated to adjust for gains in storage after compression is conducted. Of course, when the packets are retrieved, the SubStor needs to be decompressed before extracting the content of the packet data.

Figure 4B:
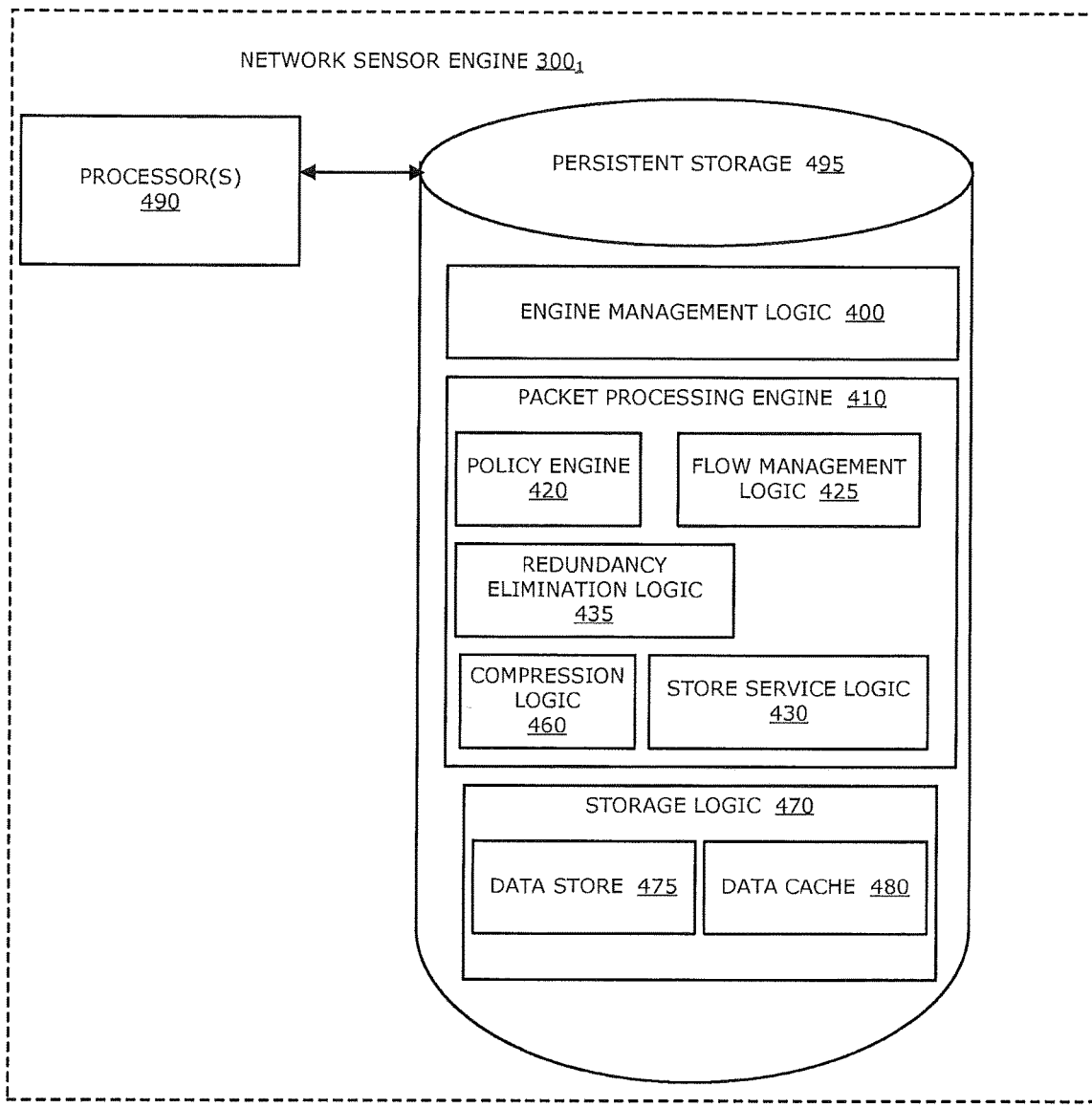
FIG. 4B is another exemplary embodiment of the network sensor engine of FIGS. 3A-3B.

Another illustrative embodiment is illustrated in FIG. 4B, in which the packet processing engine 410 is represented as software that is stored within persistent storage 495 and executed by one or more hardware processors. It is further noted that the storage logic 470 may be implemented as a software driver that controls storage within persistent storage 495.

IV. Exemplary Storblock Layout

Figure 6:
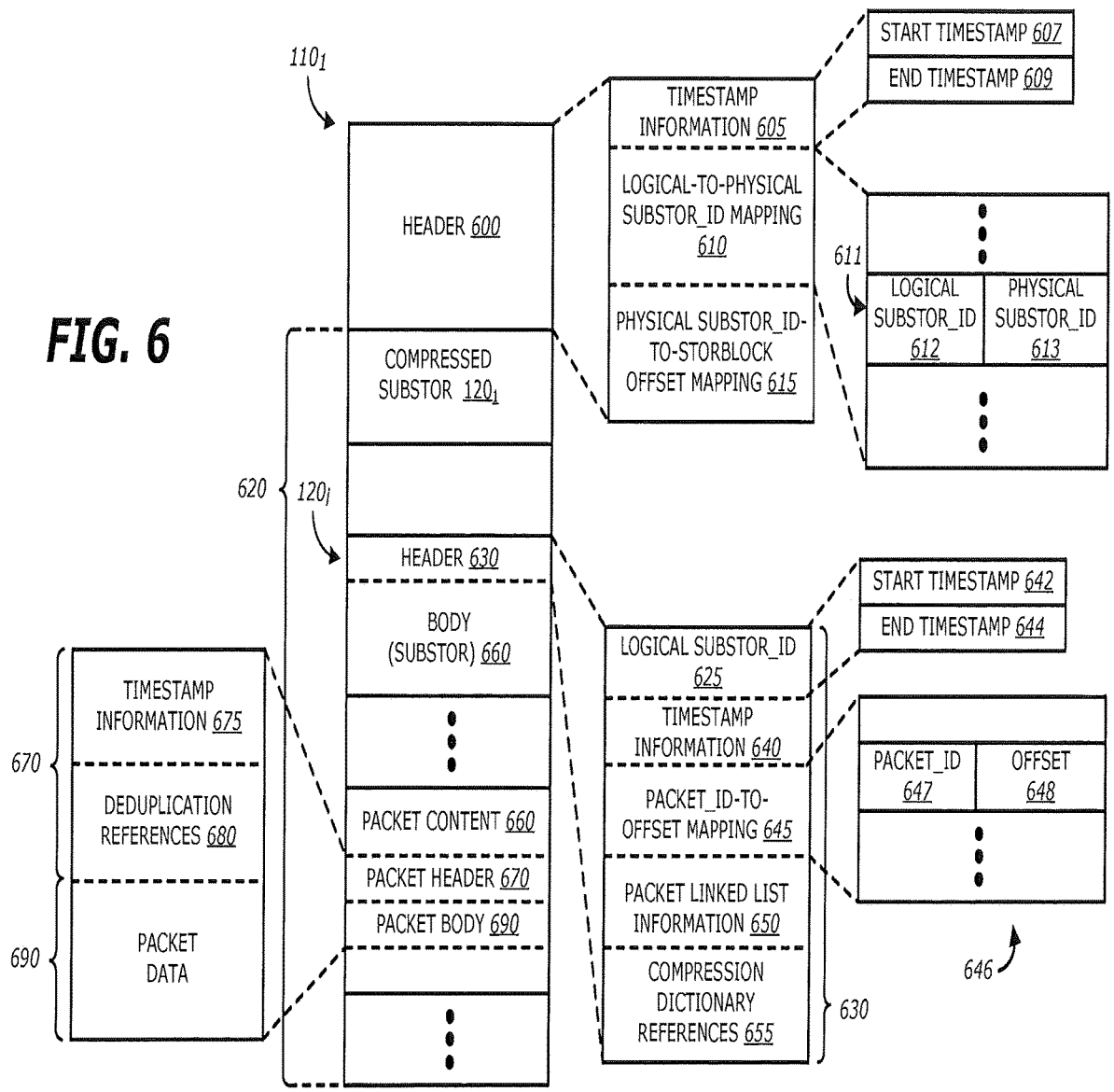
FIG. 6 is an exemplary block diagram of a logical storage layout for a StorBlock.

Referring now to FIG. 6, an exemplary block diagram of a logical storage layout for a StorBlock is shown. Herein, each StorBlock (e.g., StorBlock $110_1$) includes a header 600 and a body 620. As further shown, the body 620 includes one or more SubStors $120_1$-$120_N$, where each of these SubStor $120_i$ ($1 \leq i \leq N$) includes a header 630 and a body 660, as shown. The body 660 of each SubStor $120_i$ includes one or more packets $150_1$-$150_P$, which further includes a packet header 670 and a packet body 690, as described below.

According to one embodiment of the disclosure, the header 600 of StorBlock $110_1$ includes timestamp information 605 and a Logical-to-Physical SubStor_ID mapping 610 and a Physical SubStor_ID-to-StorBlock_Offset mapping 615. The mappings 610 and 615 provide information to identify SubStors $120_1$-$120_N$ within a particular StorBlock $110_1$ and their placement within the StorBlock $110_1$. It is contemplated that, in one embodiment, the mappings 610 and 615 may be one unified table while may be multiple tables in another embodiment.

More specifically, the timestamp information 605 includes a first (start) timestamp 607 that identifies a time (e.g., date and time with any granularity including down to milliseconds) when a first SubStor $120_1$ of the StorBlock $110_1$ is allocated to the redundancy elimination logic 435 by the store service logic 430. Similarly, the timestamp information 605 includes a second (end) timestamp 609 that identifies the time at which the last SubStor $120_N$ of the StorBlock $110_1$ is allocated. Hence, the timestamp information 605 allows for queries to the network sensor device $300_1$ for packet data within a particular period of time.

The Logical-to-Physical SubStor_ID mapping 610 includes a plurality of entries 611, where each entry includes a unique logical SubStor_ID (e.g., local SubStor_ID 612) along with a corresponding physical SubStor_ID (e.g., physical SubStor_ID 613). As the storage service logic 430 is responsible for allocating the SubStors $120_1$-$120_N$ in response to storage requests by the redundancy elimination logic 435, upon allocation of a SubStor (e.g., SubStor $120_1$), the storage service logic 430 also assigns the logical SubStor_ID 612 to that allocated SubStor (e.g., SubStor $120_1$). Hence, the logical SubStor_ID 612 is stored in the Logical-to-Physical SubStor_ID mapping 610 to identify SubStor $120_1$.

Additionally, when SubStor $120_1$ having SubStor_ID 612 reaches the prescribed capacity threshold, information (e.g., body 660 and/or header 630) within the SubStor $120_1$ is compressed and the compressed SubStor $120_1$ is returned to store service logic 430, the store service logic 430 assigns the physical SubStor_ID 613 to SubStor $120_1$. The physical SubStor_ID 613 is a value that represents placement within the StorBlock $110_1$. As SubStors $120_1$-$120_N$ may be allocated in one order, but written to physical storage in a different order, the Logical-to-Physical SubStor_ID mapping 610 maintains such ordering.

The Physical SubStor_ID-to-StorBlock_Offset mapping 615 maintains correspondence between the physical SubStor_IDs and their offsets within the StorBlock. More specifically, while each Physical SubStor_ID identifies the order that the SubStor is written to the physical storage, the offset identifies the location where the particular SubStor is located within its StorBlock (e.g., memory address offset from the starting address of the StorBlock, sector/block offset from the starting sector/block of the StorBlock, etc.).

Referring still to FIG. 6, according to one embodiment of the disclosure, the header 630 of SubStor $120_i$ includes the logical SubStor_ID 635, timestamp information 640, a Packet_ID-to-Offset mapping 645, a Packet Linked List information 650 and compression dictionary references 655. The SubStor header 630 includes information that identifies (i) the particular SubStor (e.g., SubStor $120_i$); (ii) information from which packets are maintained by SubStor $120_i$; and (iii) information associated with the compression conducted on at least the body 660 of SubStor $120_i$.

Similarly, the timestamp information 640 includes a first (start) timestamp 642 that identifies a time when the cache management logic 450 stores a first packet $150_1$ within SubStor $120_i$ and a second (end) timestamp 644 that identifies a time when a last packet $150_P$ is stored within SubStor $120_i$. Hence, the timestamp information 640 provides greater granularity for network sensor device $200_1$ in searches for packet data within the particular period of time.

The Packet_ID-to-Offset mapping 645 includes a plurality of entries 646, where each entry includes a unique Packet_ID (e.g., Packet_ID 647) along with a corresponding offset 648 that identifies the location within the SubStor $120_i$ where the particular packet information is located (e.g., memory address offset from the starting address of the SubStor $120_i$, sector/block offset from the starting sector/block of the SubStor $120_i$, etc.)

The Packet Linked List information 650 is responsible for maintaining information to identify which packets belong to a particular flow. More specifically, SubStor $120_i$ may store packets associated with a plurality of flows. The packets associated with each flow are linked together by the flow manager 320 and the packet link list information 650 identifies the particular packet(s) representing the start or end of one or more packet linked lists (e.g., head or tail of the packet linked list(s)). This enables identification as to which packets stored with the SubStor are associated with which flows.

The compression dictionary references 655 include information associated with the compression used to compress the body 660 and/or portions of the header 630. The compression dictionary references 655 may include a name and/or version of the compression algorithm, sizes used for the compression or the like. This allows different SubStors to utilize different compression types, notably where different SubStors are allocated to control storage of different types of data (e.g. encrypted, clear) and/or from different sources. For instance, encrypted data may require lossless compression due to the fact that it is unclear how the loss of particular storage element will affect the resultant data in the clear. Also, some enterprises may have certain high-priority endpoint devices (e.g., server with company's financials, etc.) which may inquire more complex compression algorithms to be used in efforts to further obfuscate the data.

Referring still to FIG. 6, according to one embodiment of the disclosure, each packet $150_1$-$150_P$ stored within the SubStor $120_i$ (e.g., packet $150_2$) includes the packet header 670 and packet body 690. As shown, the packet header 670 includes timestamp information 675 and deduplication references 680 while the packet body 690 includes the contents of the packet without the duplicative data as identified by the deduplication references 680.

The timestamp information 675 includes a first (start) timestamp that identifies a time when the cache management logic 450 assigns the packet $150_2$ to the SubStor $120_i$. The deduplicative references 680 identify the locations within the StorBlock $110_1$ where duplicated data within a previously analyzed packet is stored. As a result, this duplicated data may be removed from the packet $150_2$ and is not stored in packet body 690.

Figure 7:
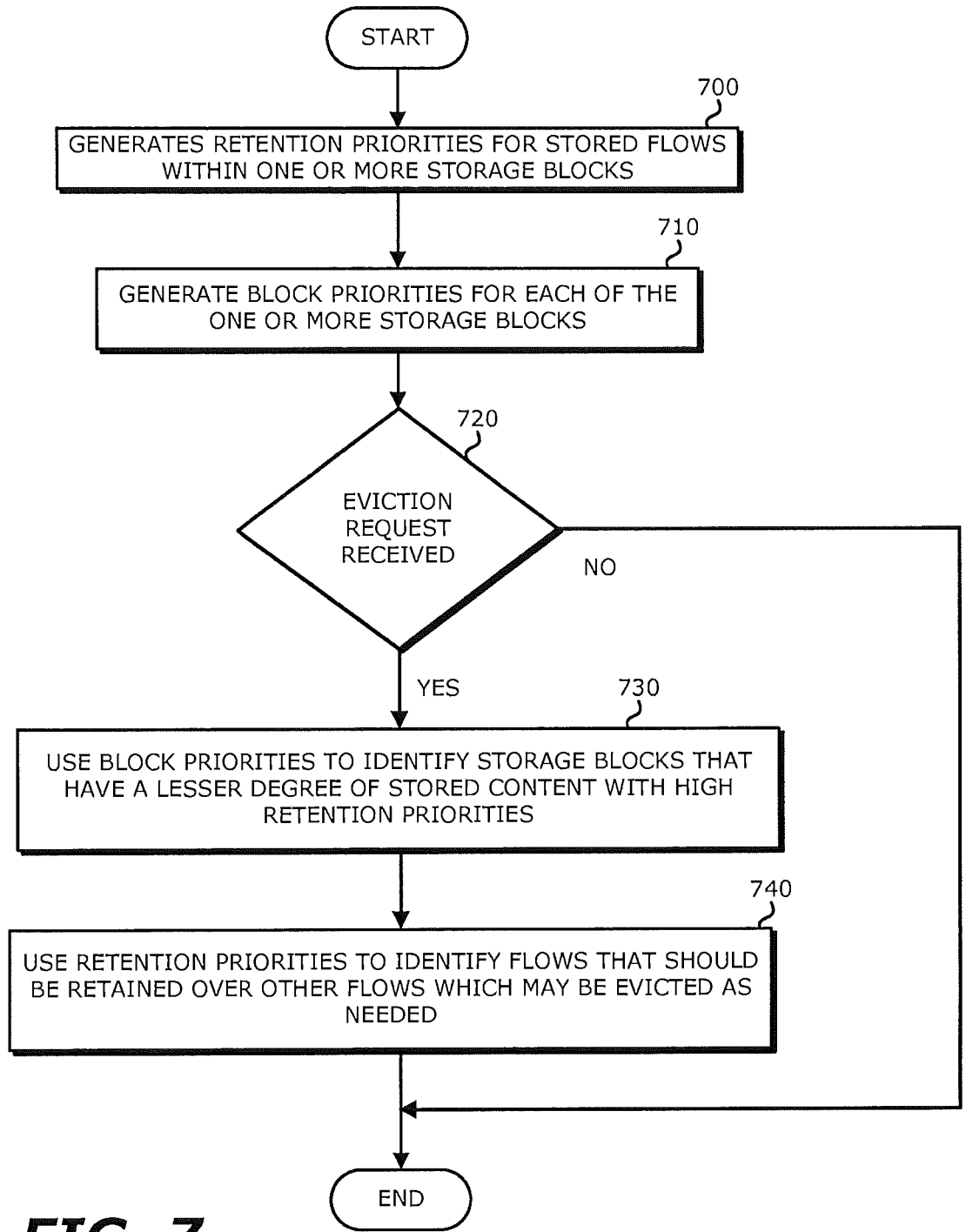
FIG. 7 is an exemplary embodiment of a flowchart directed to redundancy elimination operations conducted by the storage management logic of FIG. 4A.

Referring now to FIG. 7, an exemplary embodiment of a flowchart directed to redundancy elimination operations conducted by the hash logic 440, cache management logic 450 and deduplication logic 455 of the redundancy elimination logic 435 of FIG. 4A is shown. Herein, one or more packets are received by the redundancy elimination logic 435 for analysis (item 700). Prior to storage of content associated with a packet (identified by a Packet_ID) to a SubStor (identified by a logical SubStor_ID), a content-based hash value is generated for a first portion of the packet data (item 705). According to one embodiment of the disclosure, the content-based hash value may include a rolling hash value that is generated by conducting a one-way hash operation on the first portion of the packet data within a prescribed window and modifying a position of the window as it moves through the packet data. Of course, other techniques may be used to produce the content-based hash value.

After the content-based hash value has been generated, the cache management logic determines whether the content-based hash value is contained in the bloom filter (item 710). If not, a bit array representation of the hash value is stored (item 715). However, if a match is determined in the bloom filter, the cache management logic determines whether the hash value is currently stored within the data (dedup) cache that represents packet data already stored within the same StorBlock (item 720). If so, the analyzed portion of the packet data is considered to be duplicative of packet data already stored within the same StorBlock and offsets are set (items 725 and 730). The offsets identify a starting point (e.g., byte location within the packets) for the analyzed packet data (sometimes referred to herein as "DEST_Offset") and the previously stored packet data (sometimes referred to herein as "SRC_Offset").

As an optional feature, further analysis of the packet data may be conducted to determine if any additional data, immediately prior to and/or after the first portion of the packet data, has already been stored within the same StorBlock until no match is detected (items 735 and 740). The offset associated with the additional data in the analyzed packet data (DEST_Offset) and the offset associated with the previously stored packet data (SRC_Offset) are adjusted and maintained to be written as part of the deduplication reference (item 745). This iterative process may be conducted to generate content-based hash values that are directed to the total duplicative data being discovered.

Thereafter, a deduplication reference associated with the content-based hash value is stored as part of the packet data and the duplicated data is removed from the packet data (item 750). The deduplication reference includes the logical SubStor_ID; Packet_ID; length (in a selected measuring unit such as bytes) of the duplicated content; SRC_Offset (in the selected measuring unit); and/or DEST_Offset (in the selected measuring unit).

In the event that the content-based hash value failed to match any stored hash values within the data cache (item 720), the content-based hash value may be stored within the data cache or representative data associated with the content-based hash value is stored within the bloom filter as described below in FIGS. 9-10 (item 755).

Figure 8:
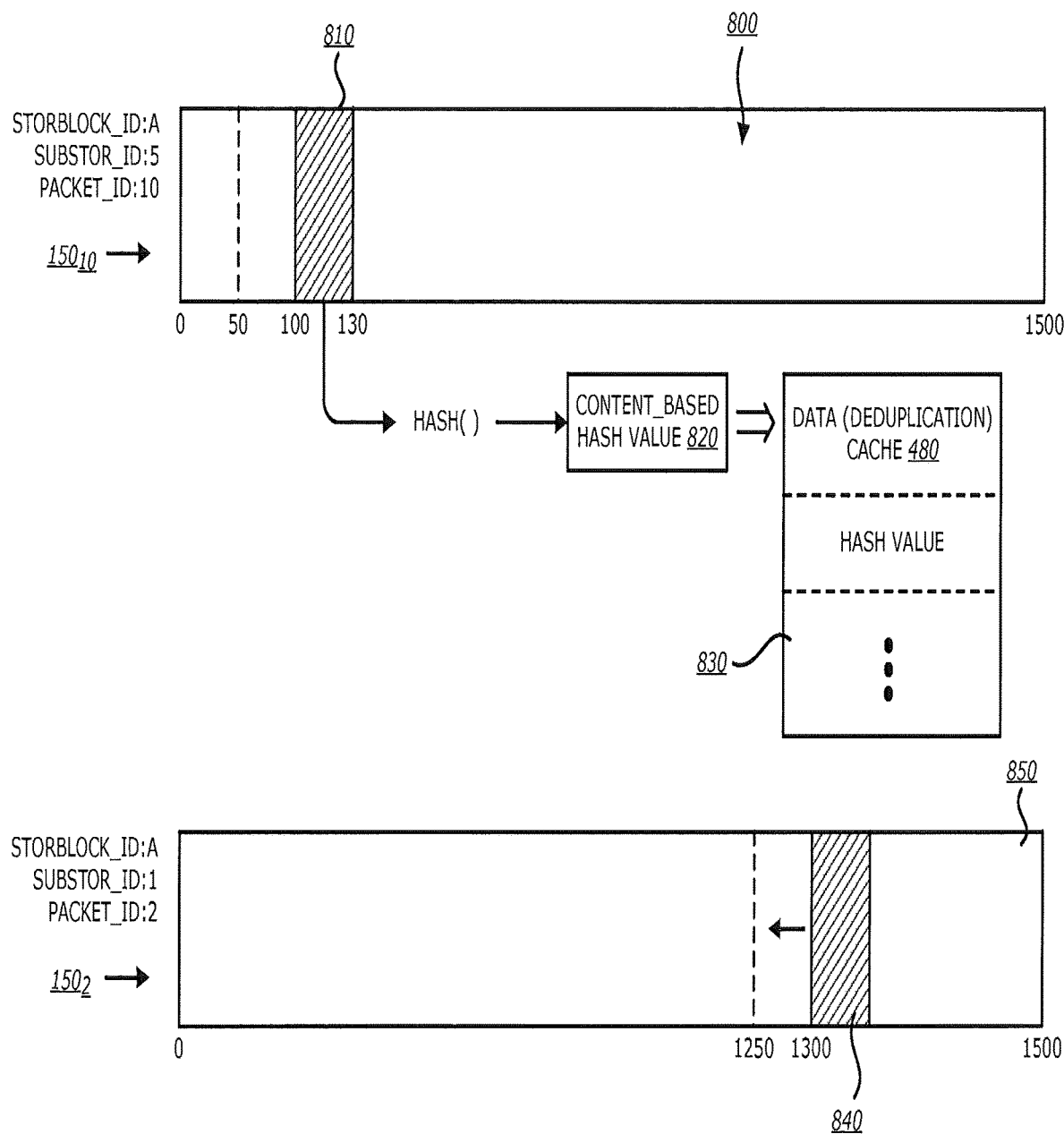
FIG. 8 is an illustrative example of redundancy elimination operations, in particular deduplication operations, as described in FIG. 7.

As an illustrative example, as shown in FIG. 8, a packet under analysis is associated with a first StorBlock $110_1$ (Stor_ID=A), a fifth SubStor $120_5$ (logical SubStor_ID=5) and a tenth packet $150_{10}$ which is stored within the fifth SubStor $120_5$ (Packet_ID=10). A hash operation is conducted on a 32-byte chunk 810 of the packet data 800 starting at byte 100 (DEST_Offset=100), which generates a content-based hash value 820. The content-based hash value 820 is compared to stored content-based hash values 830 within data cache 480 to determine if the network sensor engine has previously stored the duplicated content associated with another packet within the first StorBlock $110_1$.

If a match is detected between the content-based hash value and one of the stored hash values 830, the cache management logic 450 is able to determine that the stored hash value 830 corresponds to a 32-byte chunk 840 of the packet data 850 starting at byte 1300 (SRC_Offset=1300) of a second packet $150_2$ (Packet_ID=2) stored within the first SubStor $120_1$ (logical SubStor_ID=1) of the first StorBlock $110_1$ (Stor_ID=A). This allows the deduplication logic 455 of the redundancy elimination logic 435 to expand the packet data under analysis, in accordance with a measuring unit of a selected granularity (e.g., bit, nibble, byte, word, Dword, etc.), until it is determination is made that that the 32-byte chunk 810 along with a predetermined number of memory elements (e.g., a predetermined number of bytes such as 50 bytes for example) match bytes 1250 to 1331 of the second packet $150_2$. Hence, the content-based hash value is maintained, but the DEST_Offset is now set to 50 and the SRC_Offset is now set to 1250 for the deduplication reference.

Based on the foregoing operations, the content-based hash value may be directed to a smaller section of the packet data than the actual duplicated data. The deduplication reference includes the logical SubStor_ID=1; Packet_ID=2; length (in bytes) of the duplicated content=82; SRC_Offset=1250; and/or DEST_Offset=50.

V. Logical Representation of Data (Dedup) Cache Management

Figure 9A:
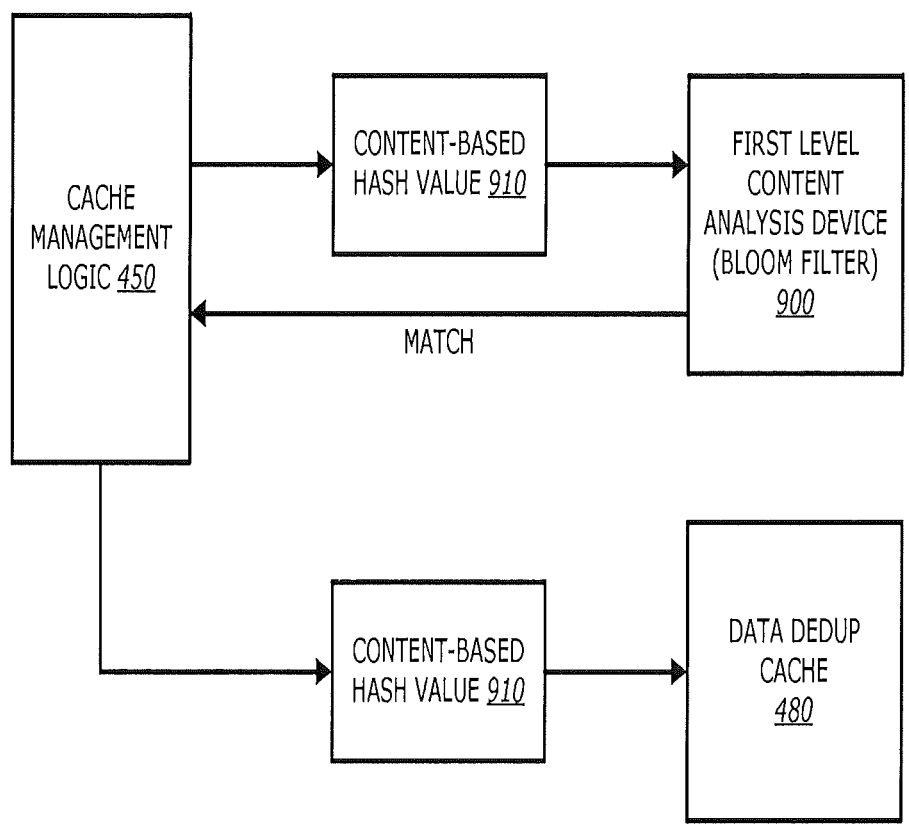
FIGS. 9A and 9B are logical representations of data (dedup) cache management.
Figure 9B:
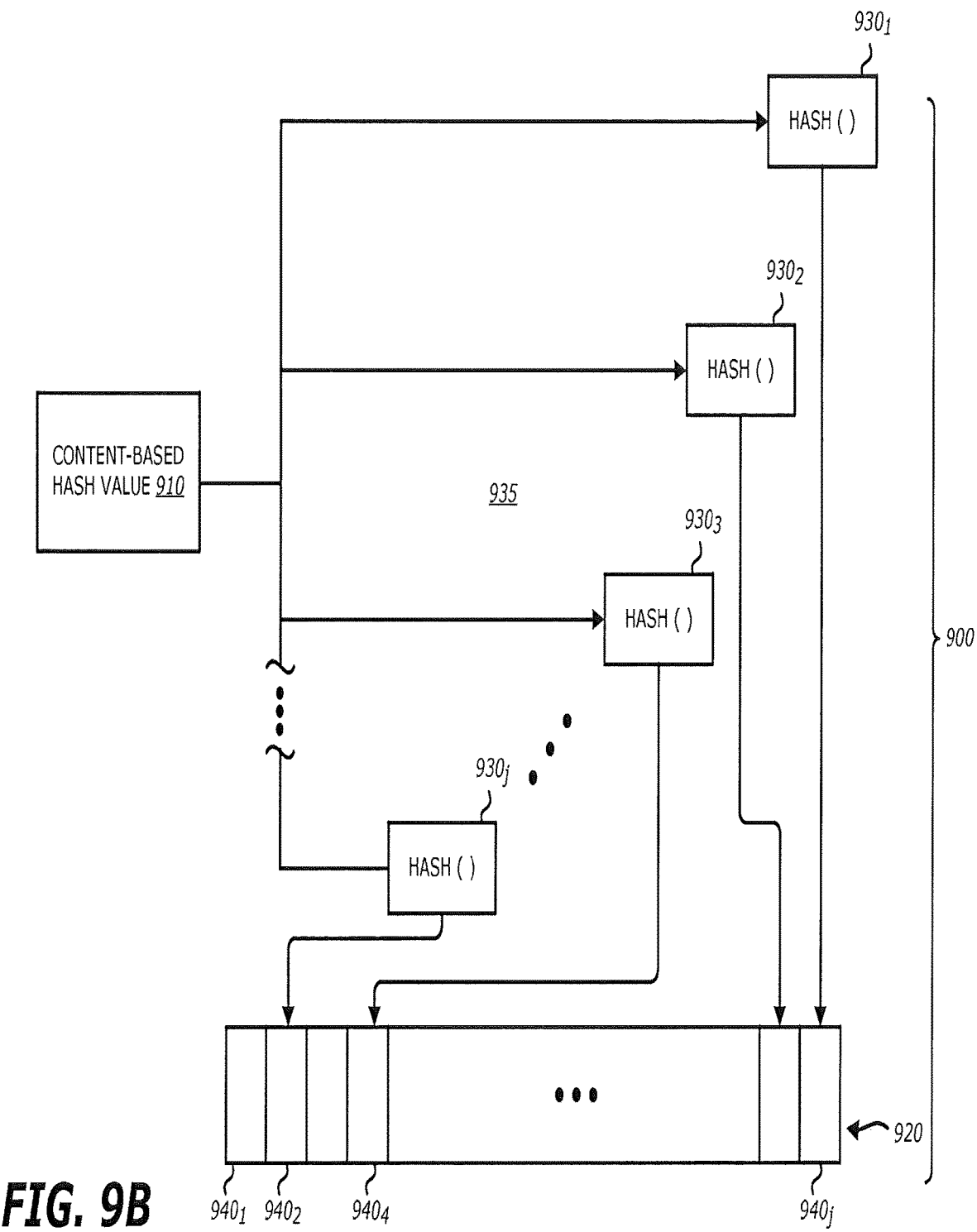

Referring to FIGS. 9A-9B, logical representations of data (dedup) cache management is shown. Herein, as described above, the cache management logic 450 within the packet processing engine 410 is responsible for prioritizing and controlling storage of content-based hash values associated with duplicated data in order to ensure retention of information that may be useful in subsequent malware analysis. According to one embodiment of the disclosure, as shown in FIG. 9A, the cache management logic 450 utilizes a first level content analysis device 900 to regulate the size of the data (dedup) cache 910 in order to reduce the amount of memory required to maintain millions and perhaps billions of different content-based hash values representative of different types of packet data.

Herein, the first level content analysis device 900 and the data (dedup) cache 480 operate in concert, where the first level content analysis device 900 is adapted to store a first predetermined number of content-based hash values using a lesser amount of memory resources than the data cache corresponding in size. According to one embodiment of the disclosure, a bloom filter may be deployed as the first level content analysis device 900 that is responsible for uploading active content-based hash values to the data (dedup) cache 480.

When deployed as a bloom filter, the first level content analysis device 900 is not adapted to store content-based hash values per se. Rather, the first level content analysis device 900 is configured to identify whether input data 910 has not been analyzed previously, and similarly, may identify whether the input data 910 has possibly been analyzed previously, where false positives may occur depending on the array size of the first level content analysis device. Herein, the first level content analysis device 900 stores values derived from the content-based hash values (input data 910) as part of analyzed "set", but such storage requires less memory.

More specifically, as an illustrative example in FIG. 9B, a content-based hash value (or portions thereof) 910 is provided to the filter level (bloom) filter 900, where an empty bloom filter is a bit array 920 of "k" bits initially set to "0" (e.g., k≥32, k=54 for this embodiment). The content-based hash value 910 may undergo multiple ("j", $1<j<k$) different hash operations 930 that generate hash results 935, each of which maps to a position $940_1$-$940_j$ with uniform random distribution on the bit array 920 so as to collectively map to j bits on the bit array 920. To query whether the content-based hash value has been previously analyzed by the bloom filter 900, which denotes the presence of duplicative packet data, the content-based hash value 910 is input into each of j hash functions to get j array positions $940_1$-$940_j$. If any of the bits at these positions are "0", the content-based hash value has not been previously detected by the bloom filter 900. Where the content-based hash value may have already been previously detected by the bloom filter 900, all the j bits would be set to "1" to denote a successful match.

When duplicative data associated with analyzed packets may be detected, namely a query to the bloom filter results in a successful match, the content-based hash value 910 is added to the data cache 480 if it has not been previously added. Stated differently, when the bloom filter 900 identifies that the content-based hash value 910 may have been previously analyzed but is not already stored in the data cache 480, the content-based hash value is added to the data cache 480. Thus, active content-based hash values are stored within the data cache 480 for prolonged retention in contrast to inactive content-based hash values. Hence, when the first level content analysis device 900 is deployed as a bloom filter, continuous addition and deletion of inactive content-based hash values within the data cache 480 may be mitigated.

VI. Logical Representations in Purging of the Data (Dedup) Cache

Referring now to FIG. 10, in order to further minimize storage capacity requirements for storing content-based hash values, the cache management logic 450 may utilize an "aged" bloom filter. More specifically, according to a first embodiment, at least two copies 1000 and 1010 forming the bloom filter 900 may be maintained, where a first bloom filter 1000 initially serves as an active filter and a second bloom filter 1010 initially serves as a "shadow" filter.

New content-based hash values 1020 are provided to and processed only by the active bloom filter 1000, but a lookup conducted by the cache management logic 450 accesses both the active and shadow bloom filters 1000 and 1010. When the capacity of the active bloom filter 1000 exceeds a prescribed threshold (e.g., storage capacity of the active bloom filter exceeds a prescribed threshold, which may be decided either by number of bytes used, time, or, total number of content-based hash values added), the active bloom filter 1000 becomes the new shadow bloom filter 1030 and the shadow bloom filter 1010 is erased and now becomes the new active bloom filter 1040. Hence, active content-based hash values are retained as part of the collective bloom filter 900, while lesser occurrences of the content-based hash values disappear in this rotation.

Figure 11:
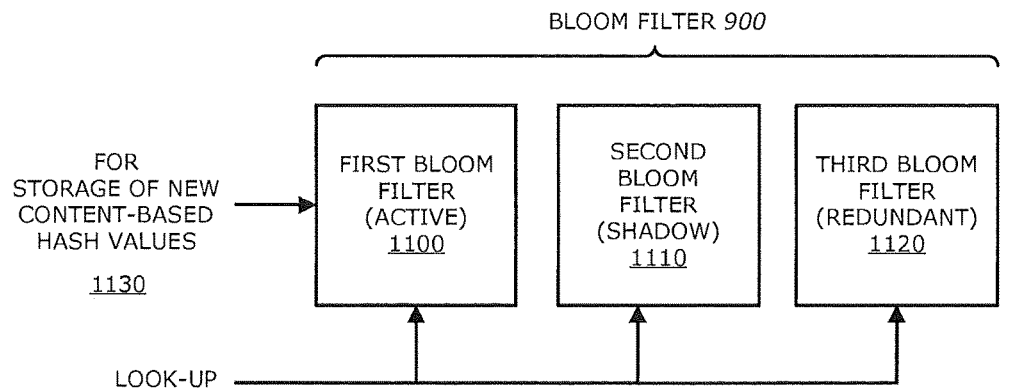
FIG. 11 is an exemplary block diagram of an "aged" bloom filter scheme with enhanced redundancy that is conducted during data cache management by the cache management logic of FIG. 4A.
Figure 11:
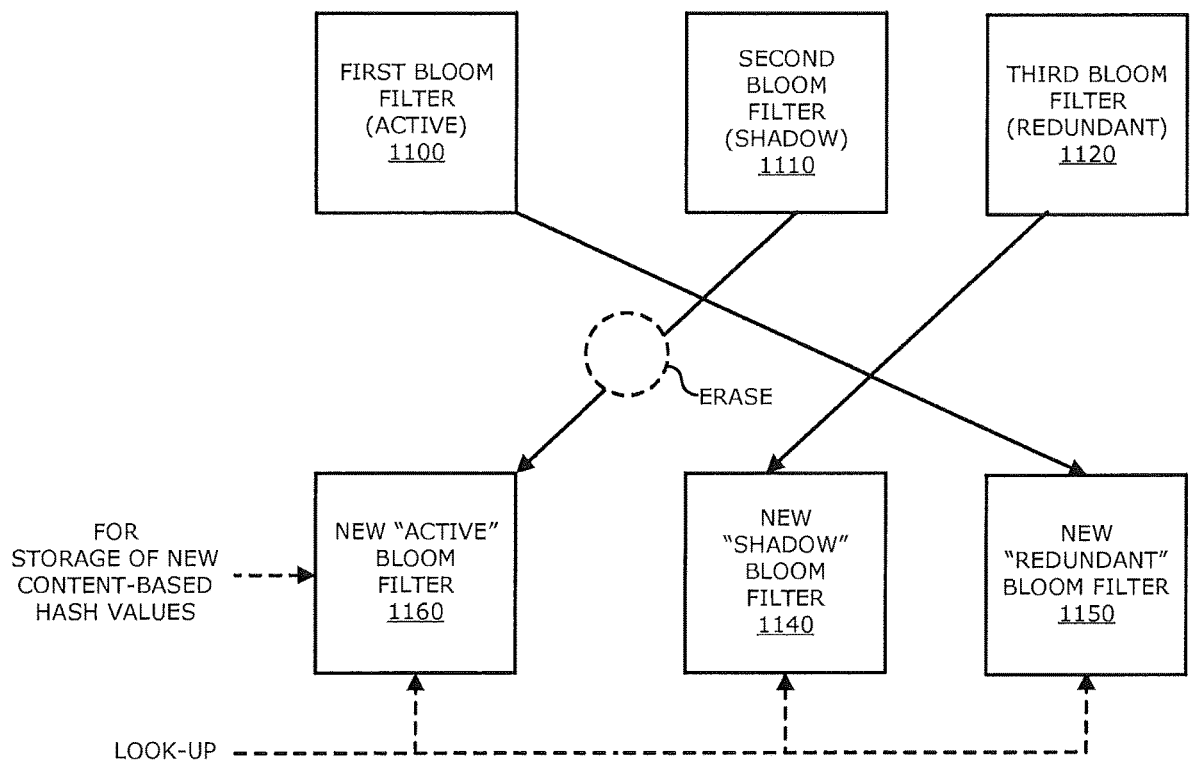

Referring to FIG. 11, in order to allow for longer aging periods of the second level cache than the first level cache, the first level cache can use a third bloom filter, which represents all entries of the second level (dedup) cache that could be evicted from the first level cache during the aging process using the pair of bloom filters as described above. More specifically, according to this embodiment, at least three copies 1100, 1110 and 1120 forming the bloom filter 900 may be maintained, where a first bloom filter 1100 initially serves as an active filter, a second bloom filter 1110 initially serves as a shadow filter and a third bloom filter 1120 initially serves as a redundant filter that includes representative data of content-based hash values currently contained within the data cache 480.

Herein, new content-based hash values 1130 are provided to and processed only by the active bloom filter 1100, but a lookup conducted by the cache management logic 450 accesses all bloom filters 1100, 1110 and 1120. When the capacity of the active bloom filter 1100 exceeds a prescribed threshold (e.g., storage capacity of the active bloom filter exceeds a prescribed threshold, which may be decided either by number of bytes used, time, or, total number of content-based hash values added), the active bloom filter 1100 becomes the new redundant bloom filter 1140 and representative data of content-based hash values that are present in the data (dedup) cache without representative data currently stored within the new redundant bloom filter 1140 are added thereto. Additionally, the redundant bloom filter 1110 becomes the new shadow filter 1150 and the shadow bloom filter 1110 is erased and now becomes the new active bloom filter 1160. Hence, information associated with active content-based hash values is retained as part of the collective bloom filter 900 for a period of time beyond the aging of hash values from the data (dedup) cache 480 of FIG. 4A. Lesser occurrences of the content-based hash values effectively disappear in this rotation but are retained in accordance with aging policies for the data (dedup) cache.

VII. Data Retrieval

As described above, every flow exports a record for each Substor that includes at least one packet, where the record (referred to as a "dedup record") includes the SubStor_ID, a Stor_Id for that SubStor, and a Packet_ID. The Packet_ID is a first or last packet associated with a packet linked list. Depending on its direction that is determined based on implementation performance and/or optimizations, the packet linked list allows for (i) access of a first packet identifier (Packet_ID) and progressing through the rest of the packet linked list or (ii) access of a last Packet_ID and progressing in reverse through the rest of the packet linked list until accessing the first Packet_ID. These dedup records are stored within the data analysis engine 320 and/or network sensor engine 300 of FIG. 3.

With respect to retrieval, a query is provided to a list of flows for which we need packets. For each of the flows, we extract their respective dedup records. The dedup records provide information including the size (e.g., number of packets or other size parameter) of the generated packet capture (pcap) and collectively provide, for each flow direction, how many packets (or bytes) are in that flow, which is part of the network sensor data exchanged between the network sensor engine and the data analysis engine. This information may be used interactively with a user interface (UI) to decide on a final presentation of the packet. Examples of type of presentations may include (1) a few packets in a message; (2) a small pcap placed in storage within the sensor and the path provided to the data analysis engine or UI; (3) a list of pcaps that could be in overlapping time order for each of the SubStors; and/or (4) a merged pcap with all the packets in time order (or the merged pcap split into smaller pcaps with packets in time order).

In the event that the network sensor device does not have sufficient storage for the packets, alternate retrieval models could include (a) Secure Copy (SCP) or File Transfer Protocol (FTP) a packet to a remote location, and/or (b) copying to an NFS or iSCSI mounted remote target.

The records are then sorted based on Stor_ID, SubStor_ID with a list of first/last Packet_IDs associated with packet linked lists. This ensures that each SubStor is decompressed (optionally decrypted prior to that) and undergoes a single fetch of the SubStor for all of the flows that has packets in that SubStor. The resultant packets should be in time order as the packet_IDs are written on a first-come basis.

The packets need to be un-deduped by resolving the references in these packets. Hence, only references in the required packets need to be resolved. When Undeduping, only the packets that has reference need to be reconstructed. This may result in further Substor fetches, but due to our scheme of referring to one single packet for specific reference this chain is greatly reduced. Also, as further optimization, only the regions in the packet that are referenced needs to be undeduped at this time.

When additional Substors are fetched from disk, some uncompressed, resolved packets can be cached for a longer period of time for packet retrieval in subsequent Substors in the same StorBlock. Again, the interactive exchange of information between the network sensor engine and the data analysis engine can help optimize this scheme. A Least Recently Used (LRU) scheme can be deployed for this Substor cache as well as the referenced packets during the undedup process to manage runtime memory during the retrieval process. Query data from analysis engine could be used for reference counting for management of cached Substors.

Extraction may be further sped up by performing multiple processes for each Substor, where StorBlock-based retrieval may optimize disk fetches. However, serial processing per StorBlock may provide more efficient resolution of dedup references. In the interactive process, sensor CPU utilization could be used to decide how many parallel retrievals can be launched.

In the foregoing description, the invention is described with reference to specific exemplary embodiments thereof. It will, however, be evident that various modifications and changes may be made thereto without departing from the broader spirit and scope of the invention.

What is claimed is:

1. A computerized method comprising:
dividing a logical storage associated with a persistent storage device into a plurality of continuous logical storage areas and further dividing each of the plurality of contiguous logical storage areas into a plurality of physical sub store regions of the persistent storage device;
analyzing incoming packets received over a transmission medium to determine whether a packet of the incoming packets include duplicated data;
selecting a continuous logical storage area from the plurality of continuous logical storage areas to initiate transfer of content of the packet of the incoming packets;
in response to determining that the packet of the incoming packets include duplicated data and determining that the duplicated data is stored in the selected continuous logical storage area, generating a bounded deduplication reference corresponding to the selected continuous logical storage area and a compression dictionary reference associated with the content of the packet that is to be stored in a particular physical sub store region in the selected continuous logical storage area, wherein the bounded deduplication reference bounds the reference to a storage location of the duplicated data to be within the selected continuous logical storage area and restricts reference to storage locations in other continuous logical storage areas from the plurality of continuous logical storage areas that are not selected, and wherein the compression dictionary reference is restricted to reference to a storage location within the selected continuous logical storage area and further within the particular sub store region where the content of the packet is to be stored; and
inserting the bounded deduplication reference into a header of the packet and removing the duplicated data from the packet prior to storing the packet to the particular physical sub store region, wherein a header of the particular physical sub store region includes the compression dictionary reference.

2. The computerized method of claim 1, wherein, responsive to a disk failure during storage of the content of the packet, data loss is confined to the selected continuous logical storage area that corresponds to the bounded deduplication reference and the other continuous logical storage areas from the plurality of continuous logical storage areas are unaffected.

3. The computerized method of claim 1, wherein the duplicated data includes data that has already been detected in an analysis of one of the incoming packets prior to the packet under analysis.

4. The computerized method of claim 1, wherein the bounded deduplication reference comprises: (i) an identifier of the packet, (ii) a value that represents a length of the duplicated data, and (iii) one or more offsets including an offset associated with the content of the packet and an offset associated with the duplicated data.

5. The computerized method of claim 1, wherein the analyzing of the packet of the incoming packets comprises:
(i) generating a hash value of a portion of the content of the packet, and
(ii) comparing the hash value to stored hash values representing packet data to determine whether the duplicated data has already been stored in the selected continuous logical storage area.

6. The computerized method of claim 5, wherein the analyzing of the packet of the incoming packets further comprises prior to comparing the hash value to the stored hash values, determining whether the hash value is contained in a pre-filter that includes values derived from hash values that require less storage area than the hash values.

7. The computerized method of claim 1, wherein the analyzing of the incoming packets includes analysis of one or more bloom filters and a hash table associated with a data cache.

8. The computerized method of claim 1, wherein selecting the continuous logical storage area from the plurality of continuous logical storage areas to initiate transfer of the content of the packet of the incoming packets comprises:
   (i) determining a processor thread associated with the incoming packets, and
   (ii) selecting the continuous logical storage area from the plurality of continuous logical storage areas that corresponds to the determined processor thread, wherein each of the plurality of continuous logical storage areas store different data in packets associated with different processor threads and compressed in accordance with different compression types respectively.

9. A network sensor comprising:
   a persistent storage device associated with a logical storage comprising a plurality of continuous logical areas and each of the plurality of continuous logical areas divided into a plurality of physical sub store regions of the persistent storage device; and
   a packet processing engine in communication with the persistent storage device, the packet processing engine comprises:
      (1) a cache management logic that analyzes incoming packets to determine whether a packet includes duplicated data and selects a continuous logical storage area from the plurality of continuous logical storage areas to initiate transfer of content of the packet, and
      (2) a deduplication logic that, when activated by the cache management logic and in response to determining that the packet includes duplicated data and determining that the duplicated data is stored in the selected continuous logical storage area, generates a bounded deduplication reference corresponding to the selected continuous logical storage area and a compression dictionary reference associated with content of the packet that is to be stored in a particular physical sub store region in the selected continuous logical storage area, wherein the bounded deduplication reference bounds the reference to a storage location of the duplicated data to be within the selected continuous logical storage area and restricts reference to storage locations in other continuous logical storage areas from the plurality of continuous logical storage areas that are not selected, and wherein the compression dictionary reference is restricted to reference to a storage location within the selected continuous logical storage area and further within the particular sub store region where the content of the packet is to be stored, and wherein the bounded deduplication reference is inserted into a header of the packet and removing the duplicated data from the packet prior to storing the packet to the particular physical sub store region, and further wherein a header of the particular physical sub store region includes the compression dictionary reference.

10. The network sensor of claim 9, wherein the packet processing engine further comprises a hash logic that conducts one or more hash operations on the portion of the incoming packets to produce a content-based hash value and the cache management logic compares the content-based hash value to stored content with a data cache to determine whether the duplicated data has already been stored in the selected continuous logical storage area, the data cache being part of the persistent storage device.

11. The network sensor of claim 10, wherein the cache management logic activates the bounded deduplication logic to generate and insert the bounded deduplication reference into the packet when the stored content within the data cache matches the content-based hash value indicating that the duplicated data has already been stored in the selected continuous logical storage area.

12. The network sensor of claim 11, wherein the cache management logic refrains from activating the deduplication logic when the stored content with the data cache fails to match the content-based hash value indicating that the duplicated data has not been stored in the selected continuous logical storage area or has been stored in other continuous logical storage areas from the plurality of continuous logical storage areas that are not selected.

13. The network sensor of claim 10, wherein the cache management logic activates the deduplication logic to generate and insert the bounded deduplication reference into the packet upon (i) determining that one or more bloom filters stores values derived from the content-based hash value, and subsequently, (ii) matching of stored content of the data cache with the content-based hash value.

14. The network sensor of claim 13, wherein the one or more bloom filters comprises a first bloom filter that serves as an active bloom filter and a second bloom filter that serves as a shadow bloom filter.

15. The network sensor of claim 13, wherein the one or more bloom filters further comprises a third bloom filter that serves as a redundant bloom filter that includes data representing the content-based hash values currently contained with the data cache.

16. A network sensor comprising:
   a persistent storage device associated with a logical storage that is divided into a plurality of continuous logical storage areas and each of the plurality of continuous logical storage areas divided into a plurality of physical sub store regions; and
   a packet processing engine in communication with the persistent storage device, the packet processing engine comprises:
      (1) a cache management logic to analyze packets to (i) determine whether a packet under analysis include duplicated data, (ii) select a continuous logical storage area from the plurality of continuous logical storage areas to initiate storage of content of the packet, and (iii) determine whether the duplicated data has already been stored in the selected continuous logical storage area corresponding to a region of the persistent storage device and
      (2) a deduplication logic configured to, when activated by the cache management logic and in response to determining that the packet includes duplicated data and determining that the duplicated data is stored in the selected continuous logical storage area, generate a bounded deduplication reference and a compression dictionary reference and insert the bounded deduplication reference and the compression dictionary reference into a header in the selected continuous logical storage area, wherein the bounded deduplication reference bounds the reference to a storage location of the duplicated data to be within the selected continuous logical storage area and restricts reference to storage locations in other continuous logical storage areas from the plurality of continuous logical storage areas that are not selected and, wherein the bounded deduplication reference further comprises:
- (i) an identifier of a storage location of the duplicated data within the region of the persistent storage device, and
- (ii) one or more offsets for use in locating at least the duplicated data within the region of the persistent storage device.

17. The network sensor of claim 16, wherein the bounded deduplication reference comprises (i) an identifier of a portion of the selected continuous logical storage area that stores the duplicated data, (ii) an identifier of the packet, (iii) a value that represents a length of the duplicated data, and (iv) the one or more offsets include a first offset that represent at least a storage location for a starting point of the content of the packet and a second offset associated with a location of the duplicated data.

18. The network sensor of claim 16, wherein the packet processing engine further comprises a hash logic to conduct one or more hash operations on a portion of the content of the packet produce a content-based hash value.

19. The network sensor of claim 18, wherein the cache management logic is configured to analyze packets to determine whether the packet under analysis include duplicated data by (1) generating a hash value of a portion of the content of the packet, and (2) comparing the hash value to stored hash values representing packet data that has already been stored in the selected continuous logical storage area.

20. The network sensor of claim 16, wherein the packet processing engine further comprising:
- a store service logic to control storage of data within the persistent storage device; and
- a policy engine to provide policy as rules of operation to control functionality of at least the store service logic, the cache management logic and the deduplication logic.

* * * * *